United States Patent
Asamizu et al.

(10) Patent No.: US 9,592,611 B2
(45) Date of Patent: Mar. 14, 2017

(54) WORKPIECE MOUNTING SYSTEM, WORKPIECE MOUNTING METHOD, SUNROOF UNIT HOLDING DEVICE, AND SUNROOF UNIT HOLDING METHOD

(71) Applicant: HONDA MOTOR CO., LTD., Tokyo (JP)

(72) Inventors: Kenichi Asamizu, Tochigi (JP); Atsushi Osada, Tochigi (JP); Yuichi Wakabayashi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 33 days.

(21) Appl. No.: 14/504,552

(22) Filed: Oct. 2, 2014

(65) Prior Publication Data

US 2015/0028611 A1 Jan. 29, 2015

Related U.S. Application Data

(62) Division of application No. 13/061,636, filed as application No. PCT/JP2009/064764 on Aug. 25, 2009, now abandoned.

(30) Foreign Application Priority Data

Sep. 3, 2008 (JP) .................................. 2008-225618
Sep. 10, 2008 (JP) .................................. 2008-232125

(51) Int. Cl.
*B23Q 3/18* (2006.01)
*B25J 15/00* (2006.01)
(Continued)

(52) U.S. Cl.
CPC ....... *B25J 15/0028* (2013.01); *B25J 15/0019* (2013.01); *B25J 15/0061* (2013.01);
(Continued)

(58) Field of Classification Search
CPC  B25B 5/14; B25B 5/147; B25B 5/163; B25B 11/02
See application file for complete search history.

(56) References Cited

U.S. PATENT DOCUMENTS

| 4,310,958 A | * | 1/1982 | Balaud | B23K 11/318 |
| | | | | 219/125.1 |
| 4,575,934 A | | 3/1986 | Kitamura et al. | |

(Continued)

FOREIGN PATENT DOCUMENTS

| JP | 62-144185 | 9/1987 |
| JP | 62-246487 | 10/1987 |

(Continued)

OTHER PUBLICATIONS mount.pdf (Mount—Definition and More from the Free-Merriam-Webster Dictionary, Dec. 18, 2013, http://www.merriam-webster.com/dictionary/mount, pp. 1-6).

(Continued)

Primary Examiner — Lee D Wilson
(74) Attorney, Agent, or Firm — Rankin, Hill & Clark LLP

(57) ABSTRACT

A workpiece mounting system mounts a sunroof member to an inner panel of a body. The workpiece mounting system is provided with a first robot, a second robot, and a control device for controlling the first and second robots. The control device performs a step of calculating as positional information the position of the sunroof member and the position of the inner panel by a CCD camera of the first robot, a step of holding and conveying the sunroof member by the first robot on the basis of the positional information and positioning the sunroof member relative to the inner panel, a step of temporarily fixing the sunroof member to the inner panel by the first robot, and a step of finally fixing the (Continued)

sunroof member to the inner panel by the second robot on the basis of the already calculated positional information.

2 Claims, 19 Drawing Sheets

(51) Int. Cl.
*B25J 19/00* (2006.01)
*B62D 65/06* (2006.01)
*B62D 65/02* (2006.01)

(52) U.S. Cl.
CPC ........ *B25J 19/0075* (2013.01); *B62D 65/024* (2013.01); *B62D 65/06* (2013.01); *G05B 2219/39559* (2013.01); *G05B 2219/45025* (2013.01); *Y10S 901/31* (2013.01)

(56) References Cited

U.S. PATENT DOCUMENTS

| | | | |
|---|---|---|---|
| 4,611,749 A | 9/1986 | Kawano | |
| 4,707,013 A * | 11/1987 | Vranish | B25J 15/026 294/119.1 |
| 4,767,046 A | 8/1988 | Kumagai et al. | |
| 4,875,273 A | 10/1989 | Yamamoto | |
| 5,201,630 A | 4/1993 | Ishida et al. | |
| 5,272,805 A | 12/1993 | Akeel et al. | |
| 5,301,411 A | 4/1994 | Fujiwara et al. | |
| 5,494,553 A * | 2/1996 | Colucci | B25B 5/003 156/580 |
| 5,778,517 A | 7/1998 | Amesbichler et al. | |
| 6,039,375 A * | 3/2000 | Bauman | B25J 15/0253 294/119.1 |
| 6,113,088 A * | 9/2000 | Gakhar | B25B 5/105 269/139 |
| 6,467,675 B1 | 10/2002 | Ozaku et al. | |
| 6,575,444 B1 * | 6/2003 | Bidaud | B23K 37/0443 269/152 |
| 6,675,467 B2 | 1/2004 | Oatridge et al. | |
| 7,913,986 B2 * | 3/2011 | Fredrickson | B23Q 3/102 269/37 |
| 2004/0055131 A1 | 3/2004 | Ghuman et al. | |
| 2004/0056498 A1 | 3/2004 | Ghuman et al. | |
| 2004/0158965 A1 | 8/2004 | Savoy | |
| 2004/0167647 A1 | 8/2004 | Ghuman et al. | |
| 2005/0044700 A1 | 3/2005 | Ghuman et al. | |
| 2006/0061145 A1 | 3/2006 | Strebe et al. | |
| 2006/0107507 A1 | 5/2006 | Brose et al. | |
| 2006/0167587 A1 | 7/2006 | Read | |
| 2007/0017081 A1 | 1/2007 | Becker et al. | |
| 2009/0016861 A1 | 1/2009 | Suga et al. | |
| 2011/0160905 A1 * | 6/2011 | Asamizu | B25J 15/0019 700/258 |
| 2011/0245971 A1 | 10/2011 | Sarh et al. | |
| 2014/0163736 A1 * | 6/2014 | Azizian | A61B 19/2203 700/259 |

FOREIGN PATENT DOCUMENTS

| | | |
|---|---|---|
| JP | 63-98883 | 6/1988 |
| JP | 1-208285 | 8/1989 |
| JP | 2-055268 | 11/1990 |
| JP | 3264221 | 11/1991 |
| JP | 4063642 | 2/1992 |
| JP | 4-315531 | 11/1992 |
| JP | 8091260 | 4/1996 |
| JP | 10-34455 | 2/1998 |
| JP | 10-35554 | 2/1998 |
| JP | 2000-219170 | 8/2000 |
| JP | 2000280192 | 10/2000 |
| JP | 2001000905 | 1/2001 |
| JP | 2004-359069 | 12/2004 |

OTHER PUBLICATIONS nest.pdf (nest—definition of nest by the Free Online Dictionary, Thesaurus and Encyclopedia, Dec. 19, 2013, http://www.thefreedictionary.com/nest, pp. 1-4).
Notice of Allowance issued in JP 2008-232125, mailed Jan. 29, 2013.
Notice of Reasons for Rejection Issued to JP Application No. 2008-232125, mailed Jun. 12, 2012 (1 page).
International Search Report, Date of Mailing: Dec. 8, 2009 (Dec. 8, 2009).

* cited by examiner

WORKPIECE MOUNTING SYSTEM, WORKPIECE MOUNTING METHOD, SUNROOF UNIT HOLDING DEVICE, AND SUNROOF UNIT HOLDING METHOD

TECHNICAL FIELD

The present invention relates to a workpiece mounting system, a workpiece mounting method, a sunroof unit holding device, and a sunroof unit holding method. More specifically, it relates to a workpiece mounting system and a workpiece mounting method for mounting a sunroof to the body of an automobile. In addition, the present invention relates to a sunroof unit holding device and a sunroof unit holding method for holding a sunroof to the body of an automobile.

BACKGROUND ART

Conventionally, a sunroof for introducing light from outside has been provided in the body of automobiles. The sunroof is formed by mounting a sunroof unit to the body.

Specifically, a sunroof unit mounting robot has been arranged in a manufacturing line for the body (refer to Patent Document 1). The sunroof unit mounting robot includes a robot arm and a hand provided to a leading end of this robot arm that supports the sunroof unit.

The hand is a rectangular frame shape, and includes two tapered pins, three cylinder units, two positioning pins, and eight nut runners. A bolt is clamped in each nut runner. The positions of the positioning pins and the nut runners in this hand are determined in advance based on the shape of the sunroof unit.

Operation of the above mounting robot is as follows.

First, the sunroof unit is held by the hand. More specifically, the sunroof unit is positioned relative to the hand, by inserting the positioning pins in the sunroof unit, and bolts clamped in the nut runners of the hand are inserted into bolt holes of the sunroof unit.

Thereafter, the robot arm is controlled to put the sunroof unit inside of the body from a front window opening of the body.

Next, the tapered pins of the hand are inserted in the positioning holes formed at the mounting positions on the body to position the hand relative to the body.

Then, the cylinder units are driven to bring the sunroof unit close to the mounting position of the body, and the nut runners are driven to thread the bolts into the nuts on the body.

According to such a mounting robot, the sunroof unit can be transported and mounted with one hand.

Patent Document 1: Japanese Patent No. 2672825

DISCLOSURE OF THE INVENTION

Problems to be Solved by the Invention

Incidentally, in recent years, it is often the case that a plurality of vehicle models is produced on one production line in order to make production lines operate efficiently. In this case, the shape of the sunroof unit may change according to the vehicle model.

However, with the structure of the above hand, the positions of the positioning pins and nut runners are determined in advance according to the shape of the sunroof unit, and thus the general versatility is low, and it has been necessary to exchange the hand for every vehicle model. As a result, there has been a problem in that the cycle time is prolonged.

In addition, with the structure of the above hand, the positions of the positioning pins and nut runners are determined in advance according to the shape of the sunroof unit, and thus the general versatility is low, and it has been necessary to exchange the hand for every vehicle model.

The present invention has an object of providing a workpiece mounting system and a workpiece mounting method having high general versatility and able to shorten the cycle time.

The present invention also has an object of providing a sunroof unit holding device and a sunroof unit holding method having high general versatility.

Means for Solving the Problems

According to the present invention, a workpiece mounting system (e.g., a workpiece mounting system 1 described later) for mounting a first workpiece (e.g., a sunroof member 3 described later) to a mounting portion (e.g., an inner panel 2A described later) of a second workpiece (e.g., a body 2 described later), includes: a first robot (e.g., a first mounting robot 5 described later) including a preliminary fixing means (e.g., a nut runner 23 described later) for performing preliminary fixing of the first workpiece to the second workpiece, a holding means (e.g., a positioning pin 223 and workpiece support pad 224 described later) for holding the first workpiece, and a position detecting means (e.g., a CCD camera 241 described later) for detecting a position of the first workpiece and a position of a mounting portion of the second workpiece; a second robot (e.g., a second mounting robot 6 described later) including a main fixing means (e.g., a fastening hand 70 described later) for performing main fixing of the first workpiece to the second workpiece; and a control device (e.g., a control device 7 described later) that controls the first robot and the second robot, the control device executing: a positional information calculating process of calculating a position of the first workpiece and a position of the mounting portion of the second workpiece as positional information by way of the position detecting means of the first robot, a positioning process of holding the first workpiece by way of the holding means of the first robot, transporting to position the first workpiece at the mounting portion of the second workpiece by way of the first robot, based on the positional information calculated in the positional information calculating process, a preliminary fixing process of performing preliminary fixing of the first workpiece to the second workpiece by way of the preliminary fixing means of the first robot, and a main fixing process of performing main fixing of the first workpiece to the second workpiece by way of the main fixing means of the second robot, based on the positional information calculated in the positional information calculating process.

According to the present invention, the first workpiece is mounted to the mounting location of the second workpiece in the following sequence.

First, the position of the first workpiece and the position of the mounting portion of the second workpiece are calculated as positional information by the position detecting means of the first robot.

Next, the first workpiece is held by the holding means of the first robot and transported by the first robot, so that the first workpiece is positioned to the mounting portion of the second workpiece, based on the positional information thus calculated.

Then, the first workpiece is preliminarily fixed to the second workpiece by the preliminary fixing means of the first robot, followed by main fixing of the first workpiece to the second workpiece being carried out by way of the main fixing means of the second robot based on the positional information already calculated.

Consequently, the roles are shared between the first robot and the second robot: only positioning and preliminary fixing of the first workpiece is performed by the first robot, and main fixing of the first workpiece is performed by the second robot. Therefore, the general versatility is raised since the shape of the first workpiece can be handled even in a case of changing for every model, by respectively configuring the first robot and the second robot to the optimal structure according to their role, whereby the cycle time can be shortened.

In addition, by simply calculating the position of the first workpiece and the position of the mounting portion of the second workpiece one time by way of the position detecting means as positional information, the operations of the first robot and the second robot are corrected based on this positional information calculated. Therefore, the operating cost can be reduced, and the cycle time can be further shortened, since it is no longer necessary for the positions of first workpiece and the mounting portion of the second workpiece to be detected many times over.

According to the present invention, a workpiece mounting method for mounting a first workpiece to a mounting portion of a second workpiece, includes the steps of: calculating a position of the first workpiece and a position of the mounting portion of the second workpiece as positional information by way of a first robot; holding the first workpiece by way of the first robot and transporting to position the first workpiece at the mounting portion of the second workpiece by way of the first robot, based on the positional information thus calculated in the calculating step; performing preliminary fixing of the first workpiece to the second workpiece by way of the first robot, and performing main fixing of the first workpiece to the second workpiece by way of a second robot, based on the positional information calculated in the calculating step.

There are similar effects according to the present invention as to the aforementioned effects.

According to the present invention, a sunroof unit holding device (e.g., a transport hand 10 described later) for holding a sunroof unit (e.g., a sunroom member 3 described later) having a substantially U-shaped main frame (e.g., a main frame 31 described later) and a center frame (e.g., a center frame 33 described later) configured to connect portions of the main frame extending substantially in parallel to each other, in which the device includes: a center frame seating portion (e.g., center frame seating portion 132 described later) on which a bottom of the center frame sits; a main frame seating portion (e.g., a main frame seating portion 125 described later) on which a bottom of a portion of the main frame substantially parallel to the center frame sits; and a pair of pressing portions (e.g., pressing portions 62A and 62B described later) configured to press the portions of the main frame extending substantially parallel to each other from inner lateral sides thereof.

The basic structures of the sunroof units are substantially common irrespective of the vehicle model, even if the shape and structure of the sunroof units differ depending on the vehicle model. Specifically, all sunroof units have a substantially U-shaped main frame and a center frame configured to connect portions of the main frame extending substantially parallel to each other as a basic structure.

Accordingly, the present invention focuses on the basic structure common to every sunroof unit, and thus the sunroof unit holding device is configured to include the center frame seating portion on which the bottom of the center frame sits, the main frame seating portion on which the bottom of the main frame sits, and the pair of pressing portions that presses lateral sides of the main frame. In other words, the sunroof unit holding device is configured to hold portions common to every sunroof unit.

Therefore, the operation in a case of mounting a sunroof unit to the body of an automobile becomes as follows, for example. First, the sunroof unit is held and transported by the sunroof unit holding device. Next, the displacement of the sunroof unit held by the sunroof unit holding device from a position taught in advance is calculated by a different mounting robot equipped with a camera. Then, the sunroof unit is received from the sunroof unit holding device while correcting the operation of the mounting robot based on the displacement thus calculated, and this sunroof unit received is mounted to the body.

Accordingly, since the portions common to every sunroof unit are held by the sunroof unit holding device, multiple types of sunroof units can be held by a single sunroof unit holding device, thereby raising the general versatility of a facility.

According to the present invention, a sunroof unit holding method for holding a sunroof unit having a substantially U-shaped main frame and a center frame configured to connect portions of the main frame extending substantially in parallel to each other, includes the steps of: supporting a bottom of the center frame and a portion of the main frame substantially parallel to the center frame; and holding the sunroof unit by pressing the portions of the main frame substantially parallel to each other from inner lateral sides thereof.

There are similar effects according to the present invention as to the aforementioned effects.

Effects of the Invention

According to the present invention, the roles are shared between the first mounting robot and the second mounting robot: only positioning and preliminary fixing of the first workpiece is performed by the first robot and main fixing of the first workpiece is performed by the second robot. Therefore, the general versatility is raised since the shape of the first workpiece can be handled even in a case of changing for every model, by respectively configuring the first robot and the second robot to the optimal structure according to their role, whereby the cycle time can be shortened. In addition, by simply calculating the position of the first workpiece and the position of the mounting portion of the second workpiece one time by way of the position detecting means as positional information, the operations of the first robot and the second robot are corrected based on this positional information calculated. Therefore, the operating cost can be reduced, and the cycle time can be further shortened, since it is no longer necessary for the positions of first workpiece and the mounting portion of the second workpiece to be detected many times over.

PREFERRED MODE FOR CARRYING OUT THE INVENTION

Each embodiment of the present invention will be explained hereinafter based on the drawings.

First Embodiment

Figure 1:
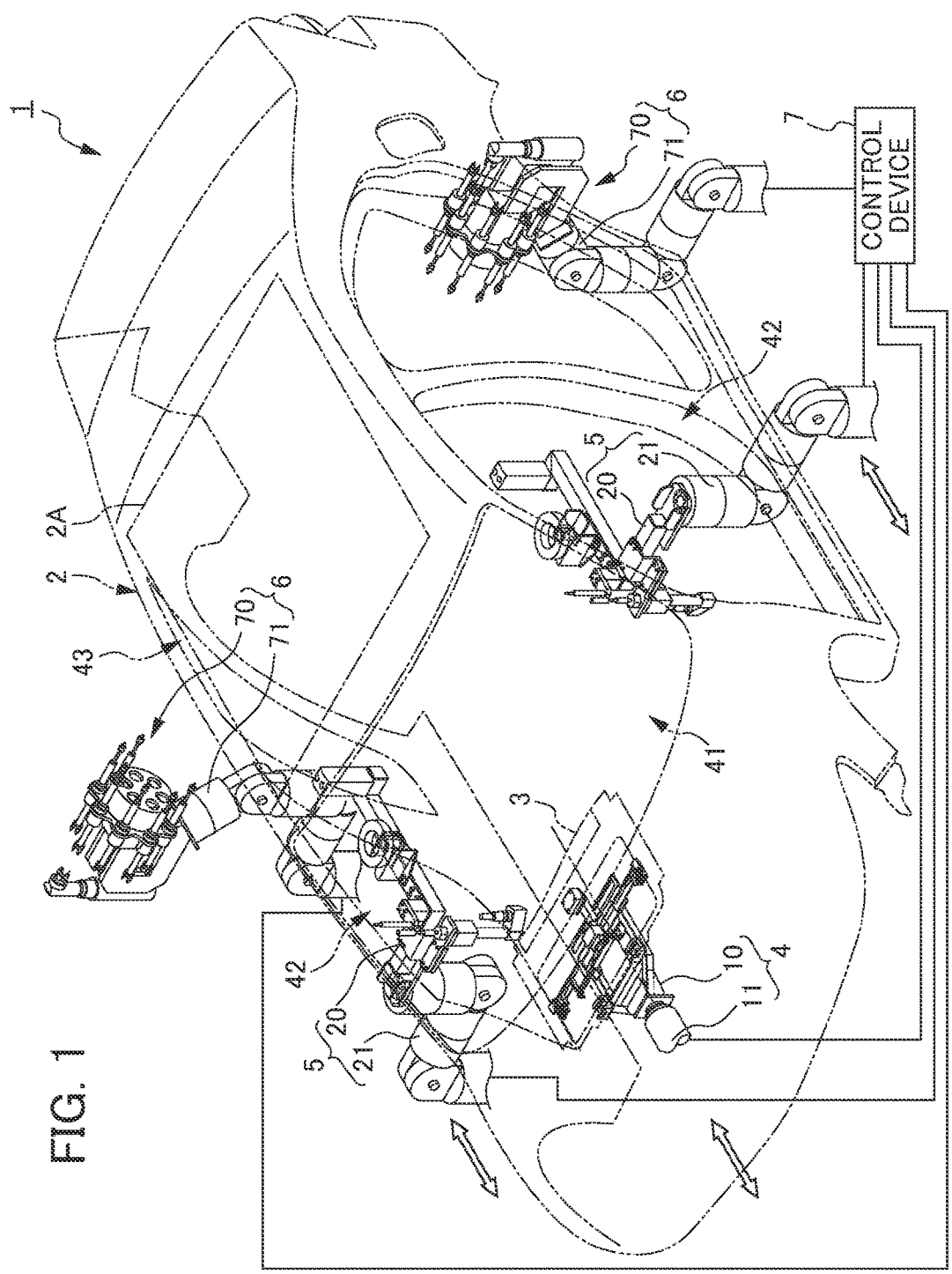
FIG. 1 is an overall perspective view of a workpiece mounting system according to a first embodiment of the present invention.

FIG. 1 is an overall perspective view of a workpiece mounting system 1 according to an embodiment of the present invention.

The workpiece mounting system 1 mounts a sunroof member 3 serving as a first workpiece to a body 2 serving as a second workpiece, which is transported by a transport conveyor that is not illustrated.

A front window opening 41 in which the front window is mounted is formed in a front of the body 2, and front door openings 42 in which front doors are mounted are formed in both sides of the body 2.

The sunroof member 3 is mounted to a roof 43 of the body 2 from an interior side of the body 2.

The workpiece mounting system 1 includes a transport robot 4 that transports the sunroof member 3 to a vicinity of the mounting positions on the body 2, a pair of first mounting robots 5 as a first robot that receives the sunroof member 3 from the transport robot 4, and perform positioning and preliminary mounting of the sunroof member 3 thus received to the body 2, a pair of second mounting robots 6 as a second robot that performs main fixing of the sunroof member 3 thus primarily mounted, and a control device 7 that controls the transport robot 4, first mounting robots 5, and second mounting robots 6.

Figure 2:
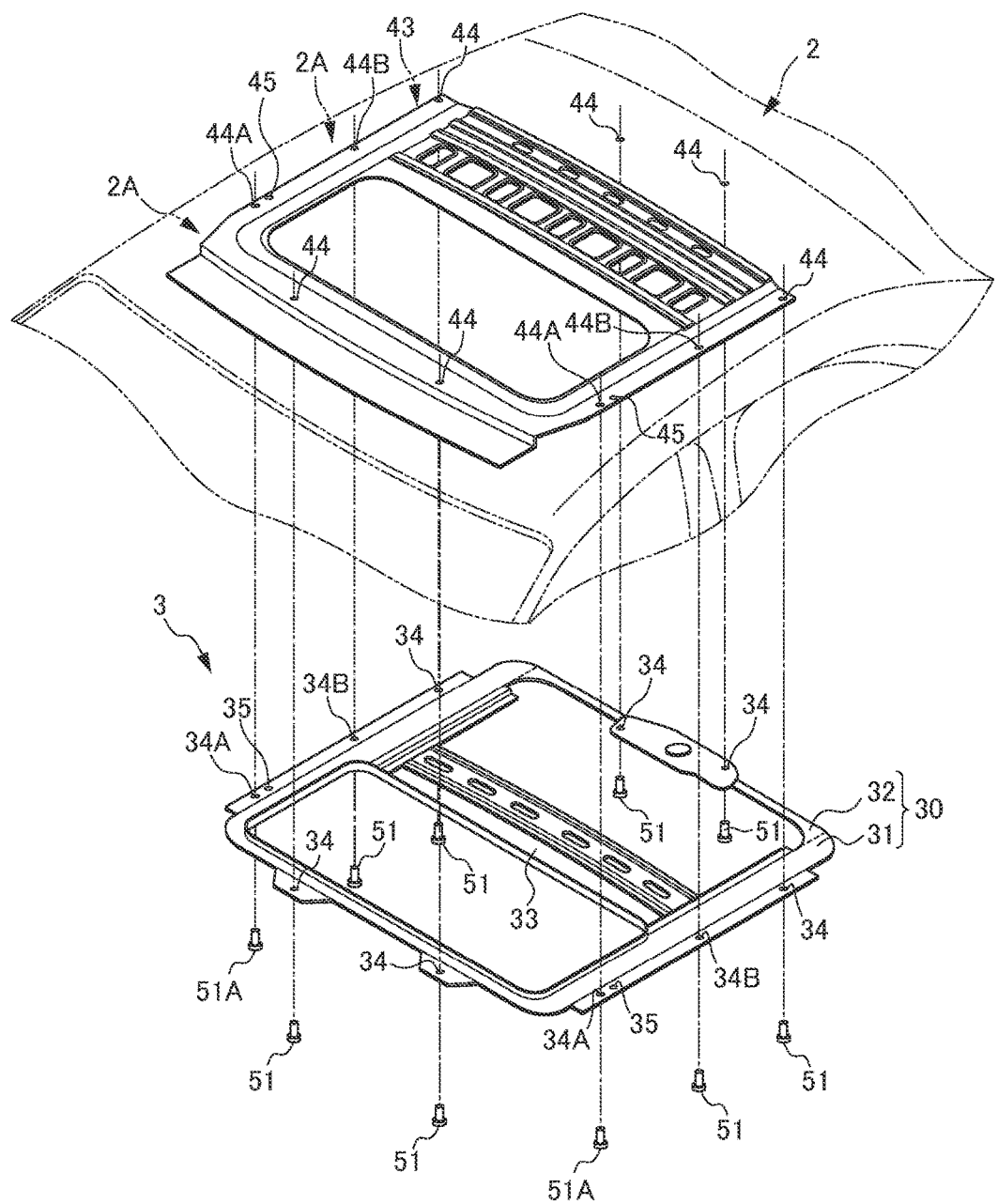
FIG. 2 is a perspective view of a sunroof member and a portion to which the sunroof member is mounted according to the embodiment.

FIG. 2 is a perspective view of the sunroof member 3 and an inner panel 2A serving as a mounting portion to which the sunroof member 3 is mounted.

The sunroof member 3 includes a rectangularly-shaped frame 30 and a center frame 33 provided to straddle portions of the frame 30 facing each other.

The rectangularly-shaped frame 30 is configured by a substantially U-shaped main frame 31, and a sub-frame 32 configured to connect leading end portions of the main frame 31 that extend substantially in parallel to each other.

The center frame 33 connects portions of the main frame 31 extending substantially in parallel to each other.

Among the frames configuring the sunroof member 3, the main frame 31 and the center frame 33 make the basic structure common to various sunroof members.

Ten bolt holes 34 are formed in a rim portion of the sunroof member 3. Among these bolt holes 34, those positioned on both front sides of the sunroof member 3 are defined as bolt holes 34A, and those disposed backward of these bolts holes 34A are defined as bolt holes 34B.

In addition, positioning holes 35 are formed in a vicinity of these bolt holes 34A.

The inner panel 2A is a panel configuring the inside of the roof 43 of the body 2. Nuts 44 are formed in the inner panel 2A to correspond to the bolt holes 34 of the sunroof member 3. Among these nuts 44, assuming that those corresponding to the bolt holes 34A of the sunroof member 3 are defined as nuts 44A, positioning holes 45 are formed in a vicinity of these nuts 44A to correspond to the positioning holes 35 of the sunroof member 3. In addition, among these nuts 44, those corresponding to the bolt holes 34B of the sunroof 3 are defined as nuts 44B.

The sunroof member 3 is mounted to the inner panel 2A by inserting bolts 51 into the bolt holes 34 of the sunroof member 3 from the interior side of the body 2, and threading into the nuts 44 of the inner panel 2A. Herein, among the bolts 51, those threaded into the nuts 44A are defined as bolts 51A.

Referring back to FIG. 1, the transport robot 4 is disposed at a front side of the body 2. It holds the sunroof member 3 and moves toward the body 2 such that it transports the sunroof member 3 to the interior of the body 2.

The transport robot 4 includes a transport hand 10, and a robot arm 11 that is provided on a floor to be movable along a length direction of the body 2 and that causes the attitude and position in three-dimensional space of the transport hand 10 to change.

Figure 3:
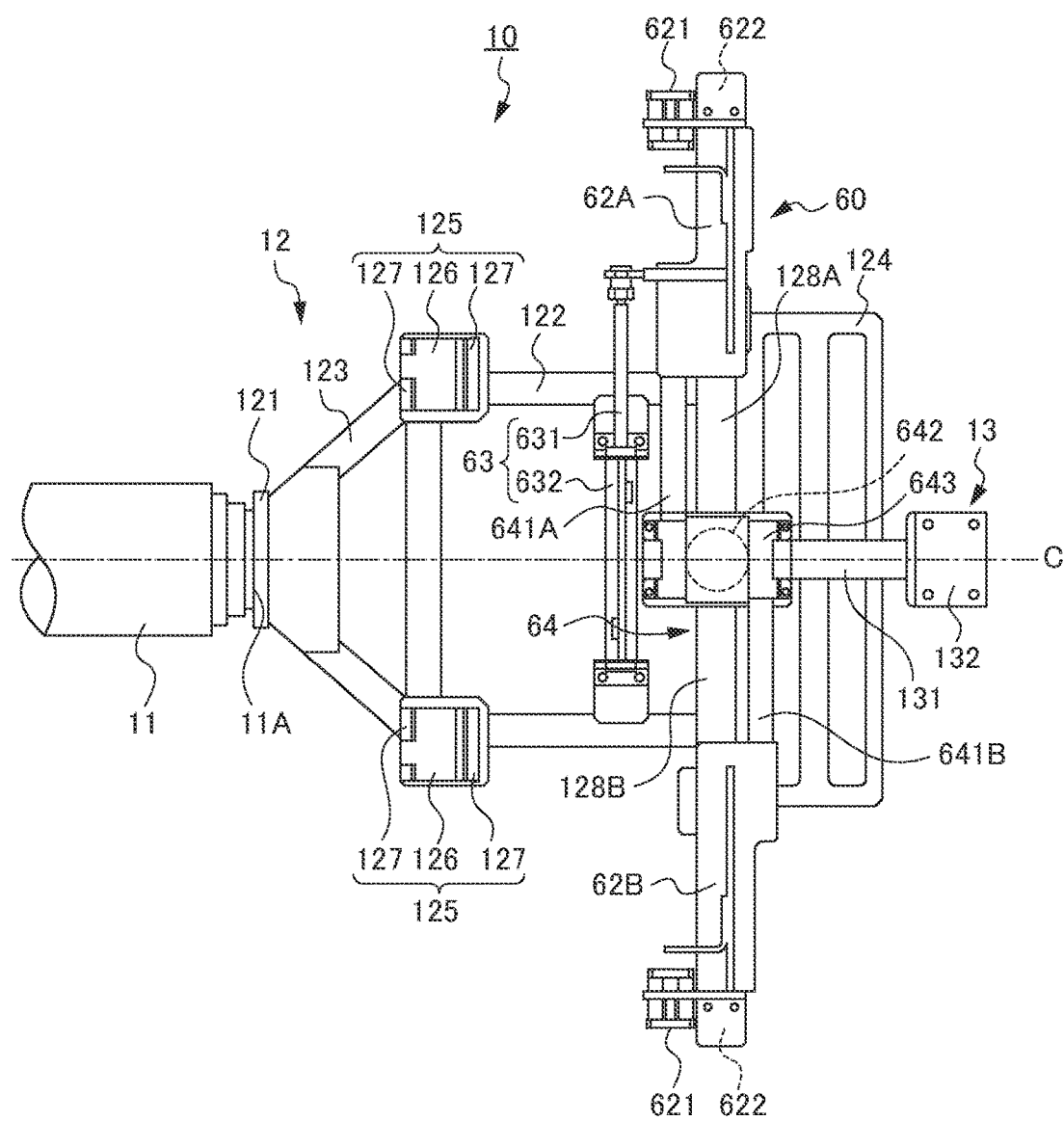
FIG. 3 is a plan view of a transport hand of a transport robot according to the embodiment.
Figure 4:
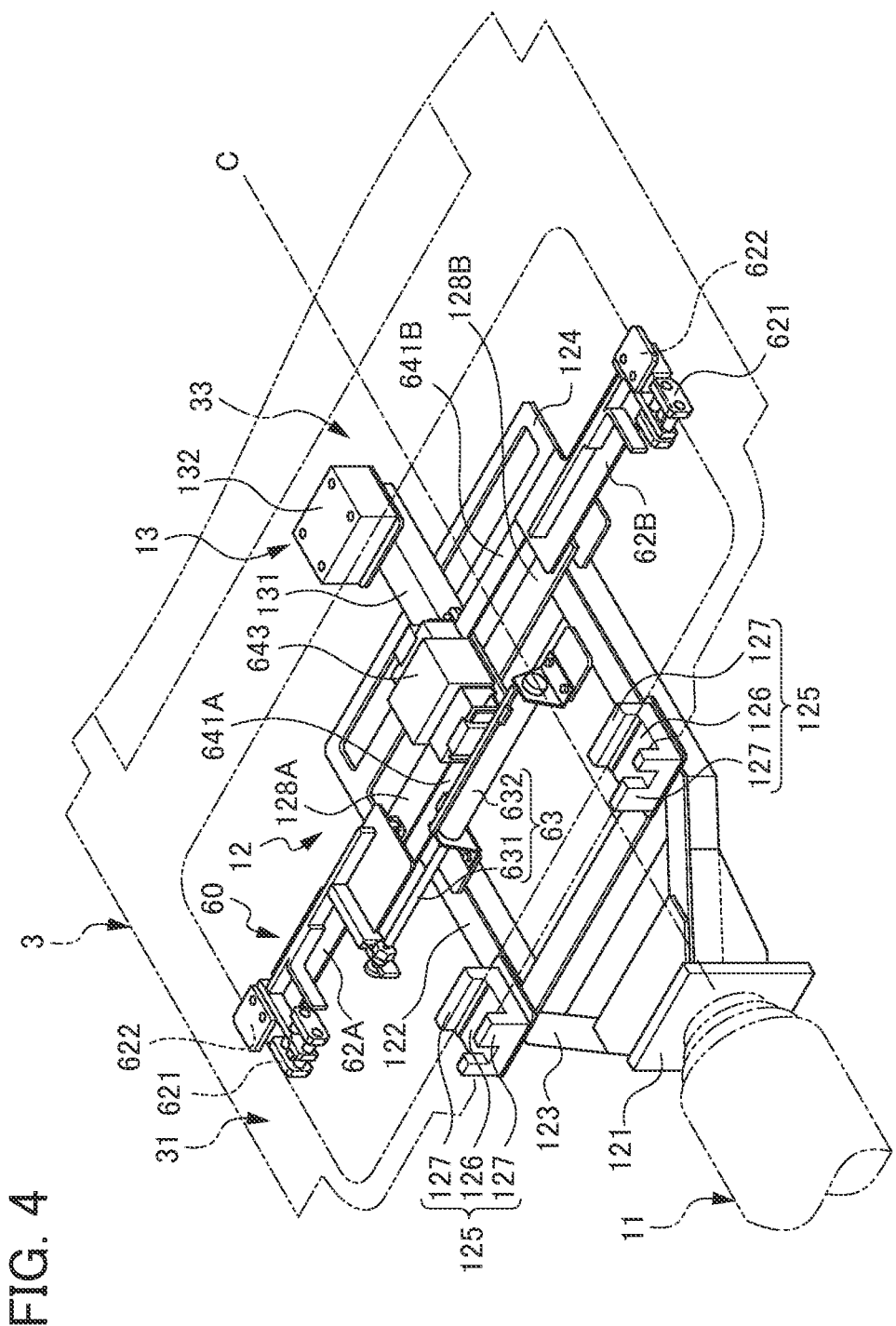
FIG. 4 is a perspective view of the transport hand according to the embodiment.

FIG. 3 is a plan view of the transport hand 10 of the transport robot 4. FIG. 4 is a perspective view of the transport hand 10.

The transport hand 10 is substantially cross-shaped in a plan view, and includes a plate-shaped base portion 12 that extends along a central axis C of a flange surface 11A of the robot arm 11, a holding mechanism 60 provided to the base portion 12, and a projecting portion 13 that projects from a leading end of the base portion 12 along the central axis C.

The projecting portion 13 includes a support portion 131 supported by the base portion 12, and a center frame seating portion 132 provided to a leading end of the support portion 131.

A bottom of the center frame 33 is seated on the center frame seating portion 132.

The base portion 12 includes a support portion 121 mounted to the flange surface 11A of the robot arm 11, a substantially rectangular frame portion 122, a connecting portion 123 that connects the frame portion 122 and the support portion 121, a reinforcement plate 124 provided to a leading end side of the frame portion 122, and guide portions 128A and 128B provided on the frame portion 122 that extend in a direction intersecting the central axis C.

Main frame seating portions 125 are provided at two angled portions of the frame portion 122 on a side directed to the support portion 121.

A bottom of a portion of the substantially U-shaped main frame 31 substantially parallel to the center frame 33 is seated on a main frame seating portion 125. The main frame seating portion 125 includes a base 126 and a pair of walls 127 arranged vertically to the base 126.

The pair of walls 127 is disposed opposite to each other, and extends in a direction intersecting the central axis C.

The holding mechanism 60 includes a pair of pressing portions 62A and 62B movable along the guide portions 128A and 128B, and an advance/retract mechanism 63 configured to make the pressing portion 62A advance and retract along the guide portion 128A, and a link mechanism 64 configured to make the pressing portion 62B move interlocking with the movement of the pressing portion 62A.

Slide guides, which are not illustrated, are provided to top surfaces of the guide portions 128A and 128B.

Slide rails that fit to the slide guides of these guide portions 128A and 128B are provided to bottom surfaces of the pressing portions 62A and 62B. Accordingly, the pair of pressing portions 62A and 62B are able to slide along the guide portions 128A and 128B.

A pressing surface 621 substantially perpendicular to the base portion 12 and a retaining surface 622 substantially parallel to the base portion 12 are provided to a leading end of each of the pressing portions 62A and 62B.

The advance/retract mechanism 63 is mounted in a direction intersecting the central axis C on the frame portion 122 of the base portion 12, and includes a piston rod 631 having a leading end that mounts to the pressing portion 62A, and a cylinder 632 that causes the piston rod 631 to advance and retract.

The link mechanism 64 includes a rack 641A that is mounted to the pressing portion 62A and extends in a sliding direction of the pressing portion 62A, a rack 641B that is mounted to the pressing portion 62B and extends in a sliding direction of the pressing portion 62B, a pinion 642 that is rotatably provided between these racks 641A and 641B on the central axis C and that engages with the racks 641A and 641B, and a case 643 housing the pinion 642.

A distance from the pressing portion 62A to a portion of the rack 641A engaging with the pinion 642 and a distance from the pressing portion 62B to a portion of the rack 641B engaging with the pinion 642 are made to be the same dimension. Accordingly, the distance from the pressing portion 62A to the central axis C and the distance from the pressing portion 62B to the central axis C always match each other, even when the pressing portion 62A moves along the guide portion 128A. In other words, the position of the pressing portion 62A and the position of the pressing portion 62B are always axisymmetric about the central axis C.

With the holding mechanism 60, when the piston rod 631 is made to advance by driving the advance/retract mechanism 63, the pressing portion 62A moves towards outside along the guide portion 128A. Accompanying the movement of the pressing portion 62A, the pressing portion 62B also moves towards outside along the guide portion 128B.

Therefore, when the sunroof member 3 is placed on the transport hand 10 of the transport robot 4, the center frame 33 of the sunroof member 3 sits on the center frame seating portion 132. In addition, the portions of the main frame 31 that are substantially parallel to the center frame 33 sit on the two main frame seating portions 125. More specifically, each portion of the main frame 31 that is substantially parallel to the center frame 33 fits between the pair of walls 127 of each main frame seating portion 125, whereby movement of the sunroof member 3 in a direction along the central axis C is regulated.

Thereafter, when the holding mechanism 60 is driven, the pressing portions 62A and 62B are made to move towards outside, so that lateral surfaces of the portions of the main frame 31 extending substantially parallel to each other are held while pressed from inside by pressing surfaces 621. In this manner, movement of the sunroof member 3 in-plane of the base portion 12 and in a direction intersecting the central axis C is regulated.

In addition, simultaneously with the pressing surfaces 621 abutting the lateral surfaces of portions of the main frame 31 extending substantially in parallel to each other, the retaining surfaces 622 cover top surfaces of the portions of the main frame 31 extending substantially in parallel to each other. Accordingly, movement of the sunroof member 3 in a direction substantially perpendicular to the base portion 12 is regulated.

Referring back to FIG. 1, the pair of first mounting robots 5 is disposed on both sides of the body 2, and performs preliminary mounting of the sunroof member 3 transported by the transport robot 4 to the inner panel 2A of the body 2.

The first mounting robots 5 each include a hand 20, and a robot arm 21 that is provided on a floor and causes the attitude and position in three-dimensional space of the hand 20 to change.

Although a first mounting robot 5 positioned on the left side of the body 2 will be explained below, another first mounting robot 5 positioned on the right side of the body 2 has a similar configuration, and thus the appearance of these first mounting robots 5 on the right and left sides is symmetrical about the body 2.

Figure 5:
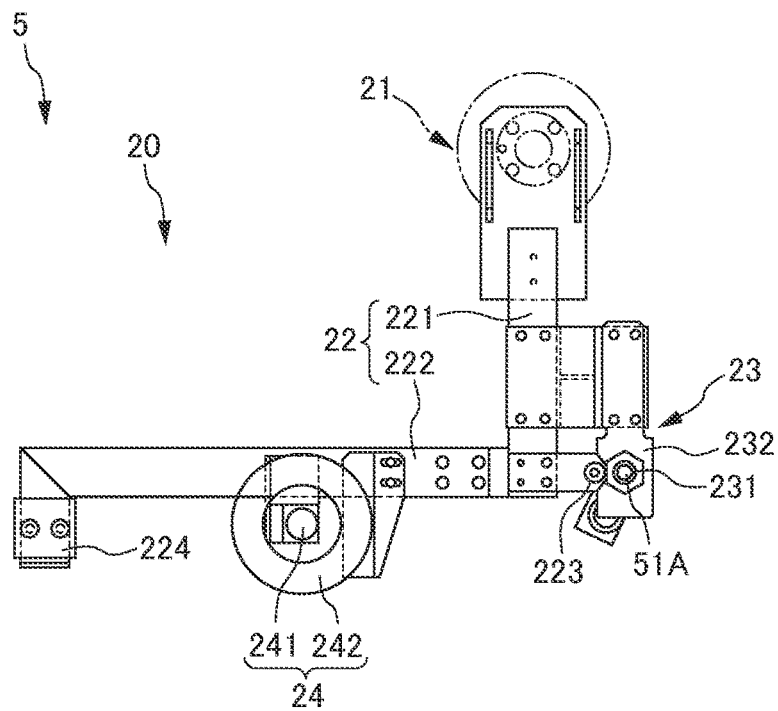
FIG. 5 is a plan view of a hand of a first mounting robot according to the embodiment.
Figure 6:
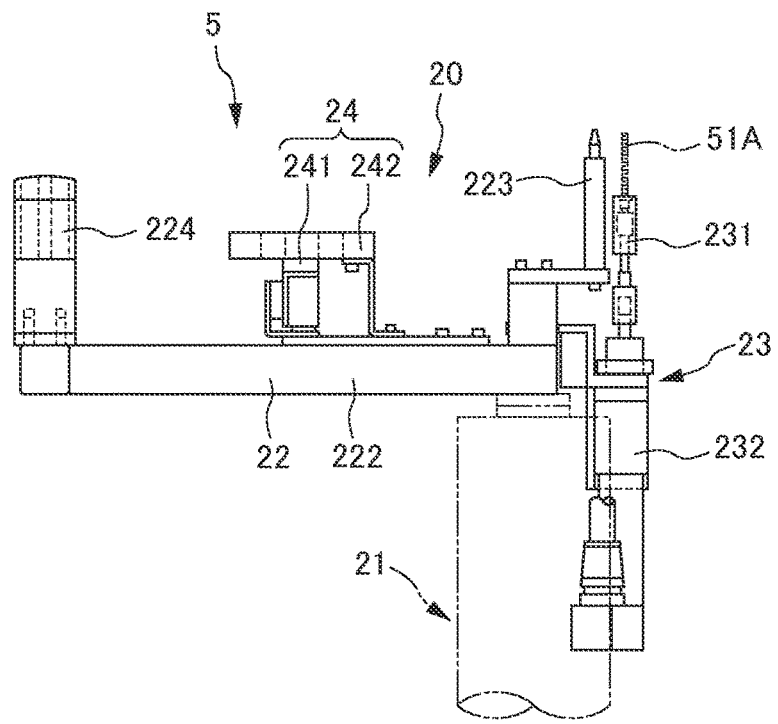
FIG. 6 is a side view of the hand of the first mounting robot according to the embodiment.
Figure 7:
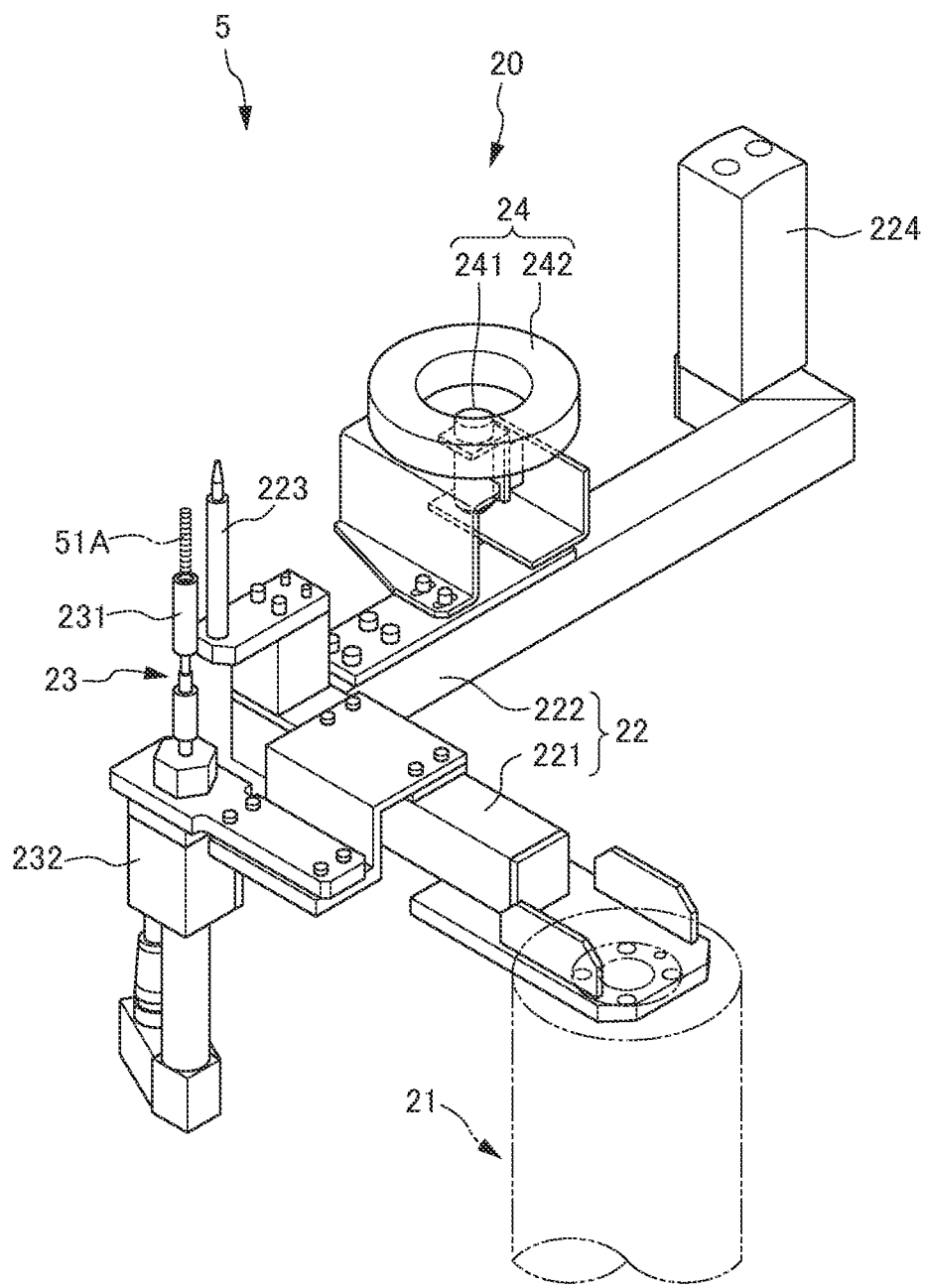
FIG. 7 is a perspective view of the hand of the first mounting robot according to the embodiment.

FIG. 5 is a plan view of the hand 20 of the first mounting robot 5. FIG. 6 is a side view of the hand 20. FIG. 7 is a perspective view of the hand 20.

The hand 20 includes a substantially L-shaped support frame 22, a nut runner 23 as preliminary fixing means provided to the support frame 22, and a photographing device 24 provided to the support frame 22.

The support frame 22 includes a first frame 221 extending from a flange surface of the robot arm 11 in an in-plane direction, and a second frame 222 orthogonal to the first frame 221 and extending from a leading end of the first frame 221.

A positioning pin 223 that projects upward is provided to an intersection portion between the first frame 221 and the second frame 222 as a holding means. In addition, a workpiece support pad 224 is provided to a top surface of the second frame 222 on a leading end side thereof as a holding means.

The nut runner 23 is provided in a middle of the first frame 221 of the support frame 22, and includes a socket 231 into which the bolt 51A fits, and a drive device 232 that rotationally drives the socket 231.

When the drive device 232 is driven in the nut runner 23, the bolt 51A fit to the socket 231 is made to rotate at a predetermined torque.

The photographing device 24 is provided in a middle of the second frame 222 of the support frame 22, and includes a CCD camera 241 disposed facing upwards as a position detecting means, and a ring-shaped lighting system 242 that illuminates a photographing target of the CCD camera 241.

Figure 8:
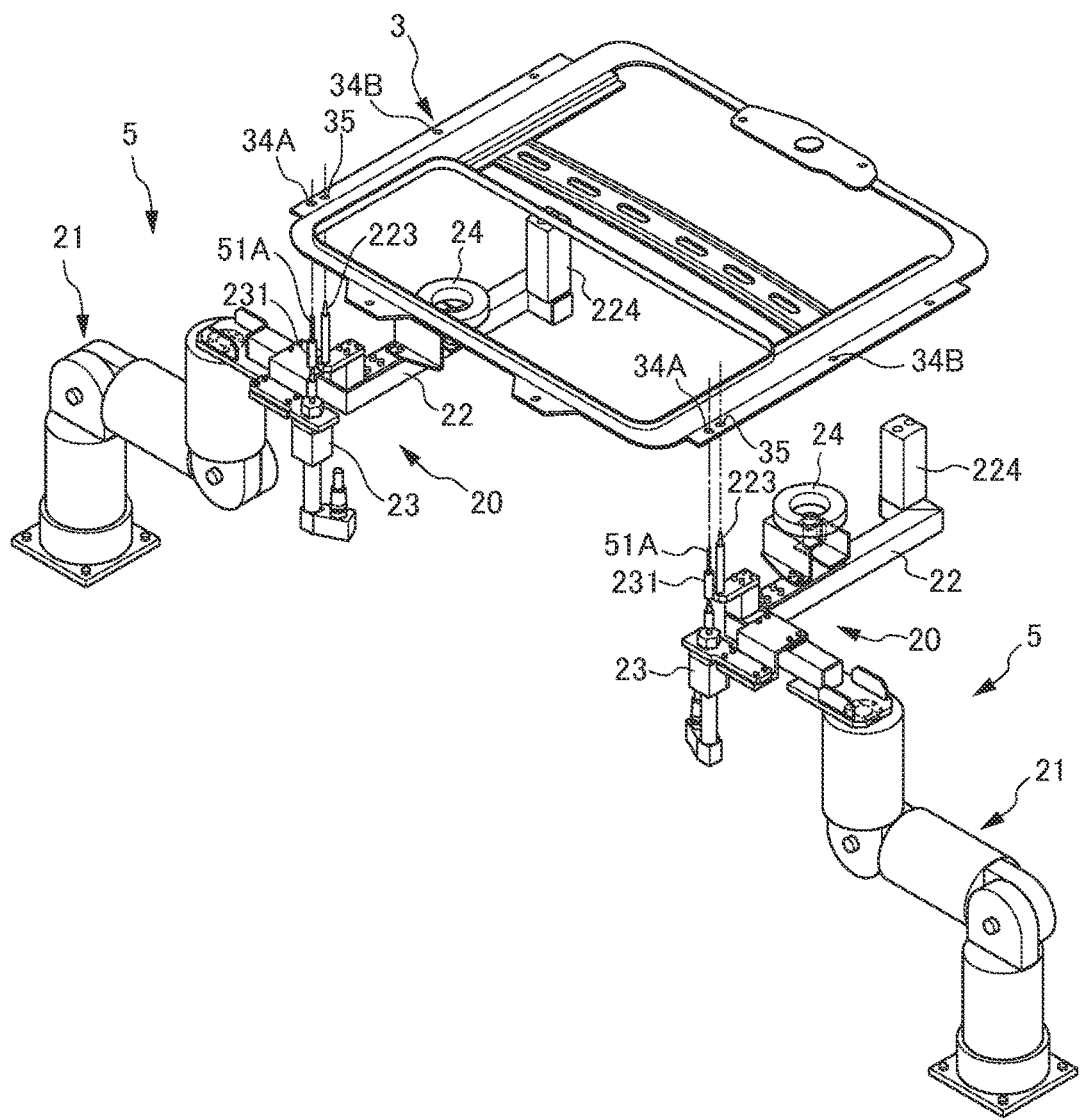
FIG. 8 is an exploded perspective view showing the sunroof member held by the first mounting robot according to the embodiment.

When the sunroof member 3 is placed on the hand 20 of the first mounting robot 5, the positioning pin 223 of the support frame 22 are inserted into the positioning hole 35 of the sunroof member 3, as shown in FIG. 8. Then, the sunroof member 3 is supported by the positioning pin 223 and the workpiece support pad 224 of the support frame 22. In addition, the bolt 51A chucked in the socket 231 of the nut runner 23 is inserted into the bolt hole 34A of the sunroof member 3.

Referring back to FIG. 1, the pair of second mounting robots 6 is disposed on both sides of the body 2, and performs main fixing of the sunroof member 3 on which preliminary mounting has been performed by the first mounting robots 5 to the inner panel 2A of the body 2.

The second mounting robots 6 each include a fastening hand 70 as main fixing means, and a robot arm 71 that is provided on a floor and causes the attitude and position in three-dimensional space of the fastening hand 70 to change.

Although a second mounting robot 6 positioned on the left side of the body 2 will be explained below, another second mounting robot 6 positioned on the right side of the body 2 has a similar configuration, and thus the appearance of these second mounting robots 6 on the right and left sides is symmetrical about the body 2.

Figure 9:
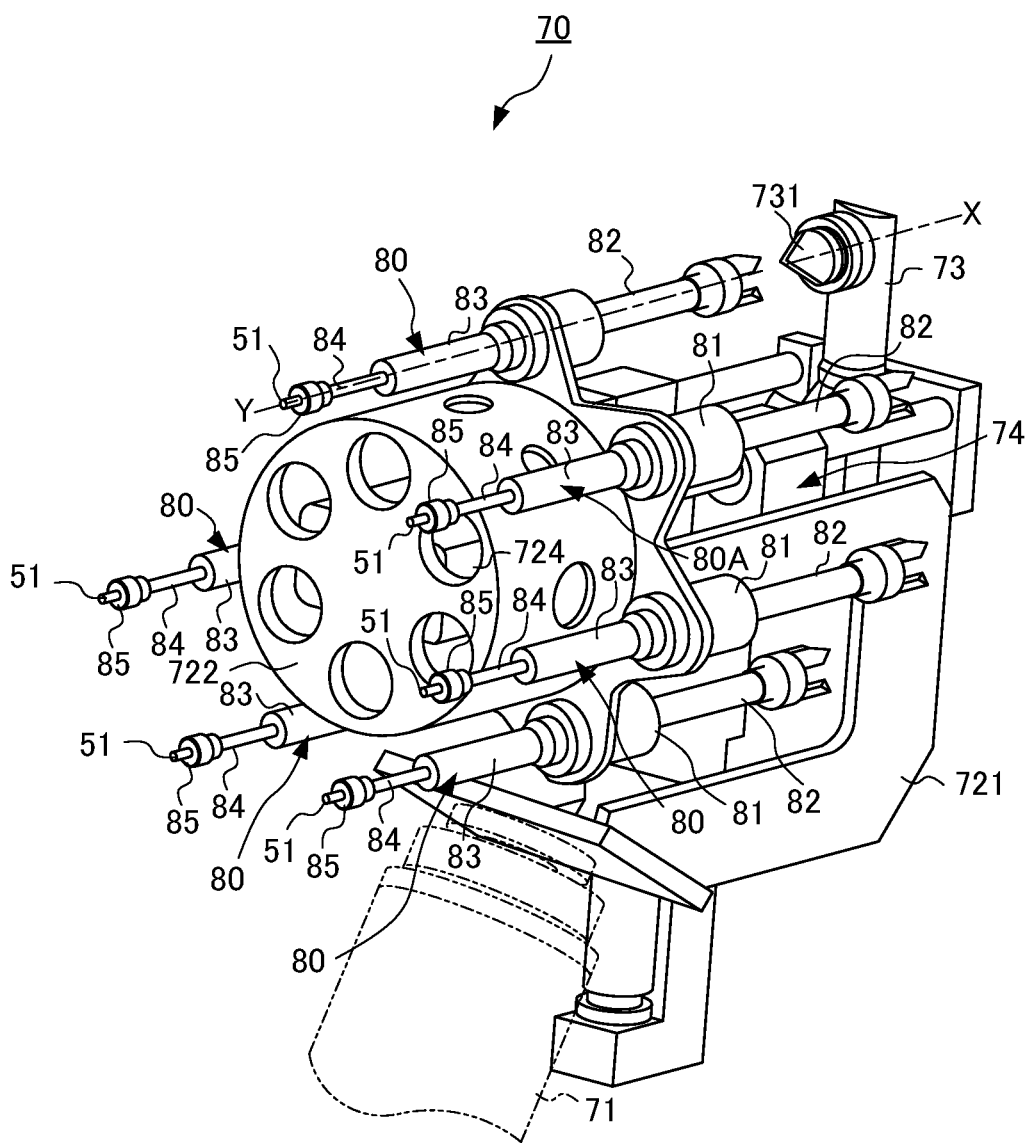
FIG. 9 is a perspective view of a fastening hand of a second mounting robot according to the embodiment.

FIG. 9 is a perspective view of the fastening hand 70 of the second mounting robot 6.

The fastening hand 70 includes a switching mechanism 72 having six fastening portions 80 and locating one among these fastening portions 80 at a predetermined position, a drive source 73 that drives rotationally, and an advance/retract mechanism 74 that causes the drive source 73 to couple with one fastening portion 80 at the predetermined position.

The switching mechanism 72 is supported by a leading end flange surface of the robot arm 71 via a mounting bracket 721.

The switching mechanism 72 includes a cylindrically shaped holder 722, the six fastening portions 80 disposed at an outer circumferential surface of the holder 722, and a holder drive portion 723 that causes the holder 722 to rotate.

The holder drive portion 723 is fixed to the mounting bracket 721.

The holder 722 is cylindrically shaped and mounted to a drive shaft of the holder drive portion 723. When the holder drive portion 723 is driven, the holder 722 rotates in an A-arrow direction or B-arrow direction about the central axis, thereby causing the fastening portions 80 to move.

Figure 10:
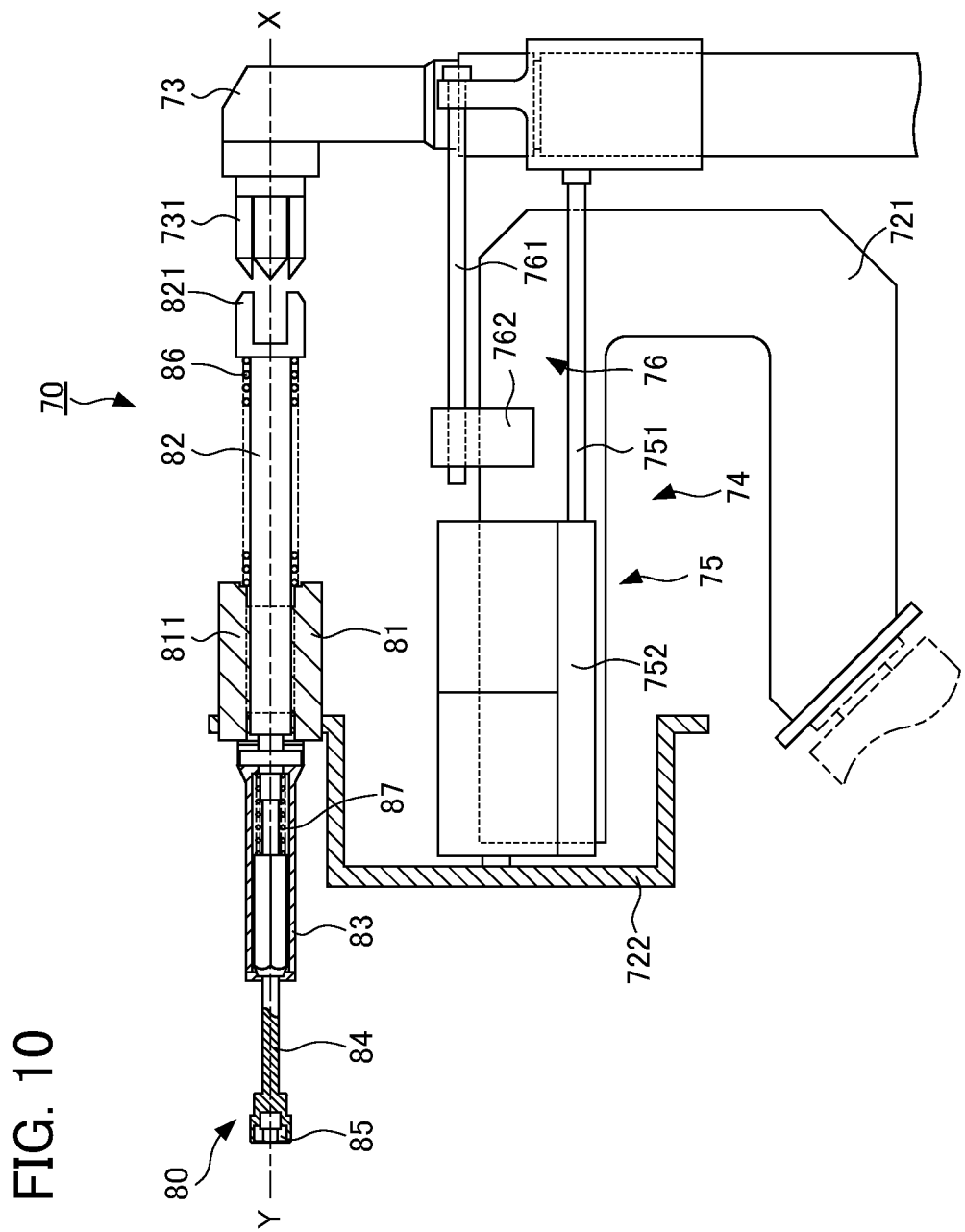
FIG. 10 is a cross-sectional view of the fastening hand of the second mounting robot according to the embodiment.
Figure 11:
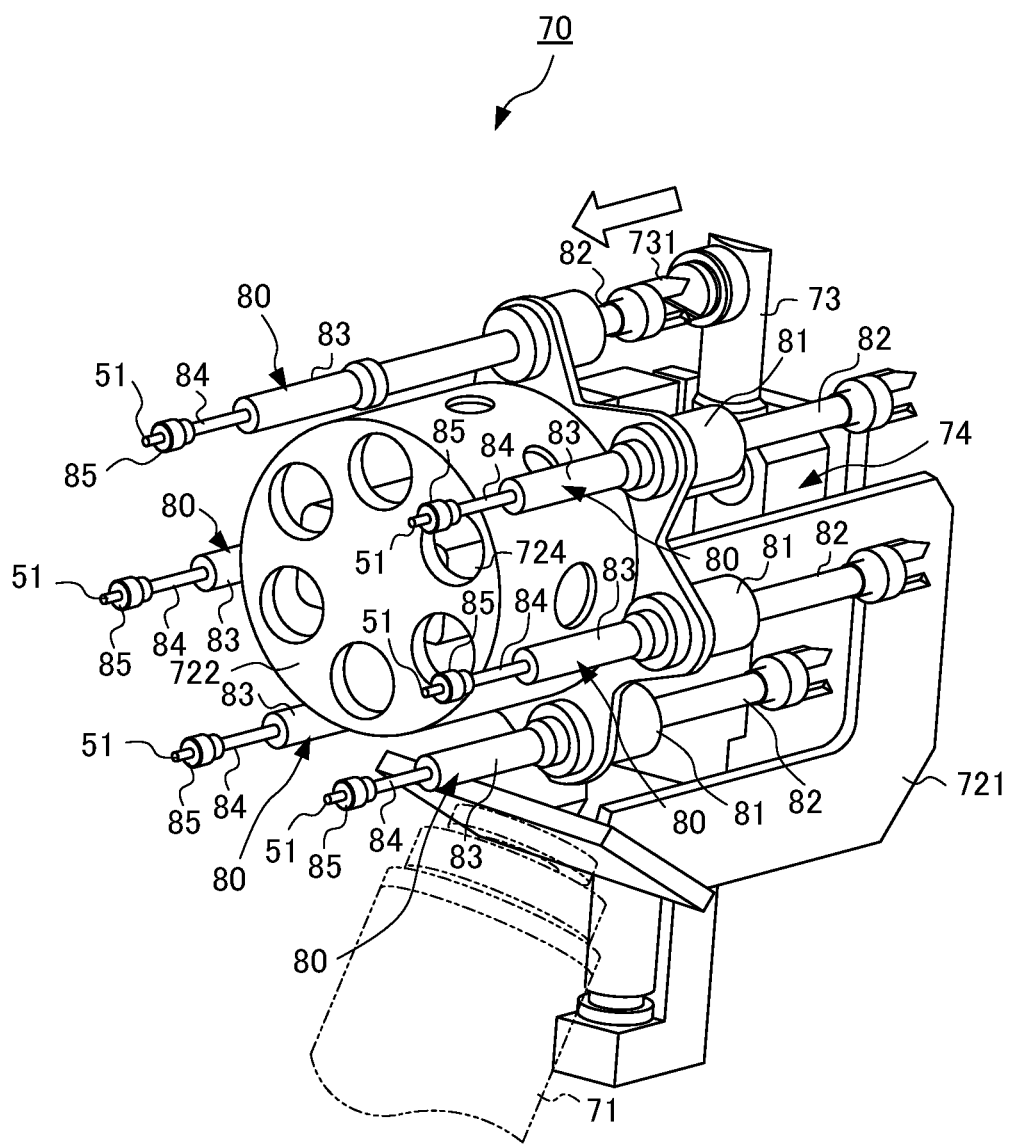
FIG. 11 is a diagram for illustrating the operation of the second mounting robot according to the embodiment.

FIG. 10 is a cross-sectional view of the fastening hand 70.

A fastening portion 80 is supported by the holder 722 rotatably about a rotational axis Y. The fastening portion 80 includes a retaining portion 81, a shaft 82, a guide portion 83, and a bit portion 84 having a socket 85.

The retaining portion 81 is cylindrically shaped. A ball spline 811 is provided inside of the retaining portion 81. The shaft 82 is inserted into the retaining portion 81 and is supported rotatable and advanceable/retractable by the ball spline 811.

A joint portion 821 is provided to a base end portion of the shaft 82. The drive source 73 is connectable with the joint portion 821.

In addition, a spring 86 is interposed between the joint portion 821 of the shaft 82 and a base end surface of the retaining portion 81.

The guide portion 83 is cylindrically shaped. The shaft 82 is connected to a base end portion of the guide portion 83. Accordingly, the rotational force of the shaft 82 is transmitted to the guide portion 83.

A base end portion of the bit portion 84 is inserted into a leading end portion of the guide portion 83. An outer circumferential surface of the base end portion of the bit portion 84 and the inner circumferential surface of the guide portion 83 are similar to each other in a hexagonal shape. Furthermore, a small gap is formed between the outer circumferential surface of the base end portion of the bit portion 84 and an inner circumferential surface of the guide portion 83.

Accordingly, the bit portion 84 freely fits to be movable relative to the guide portion 83 in a direction intersecting the axial direction and slidable in the axial direction relative to the guide portion 83. In addition, when the guide portion 83 rotates, the bit portion 84 subordinately rotates relative to the rotation of the guide portion 83.

In addition, the shaft 82 is inserted into the base end portion of the bit portion 84.

A spring 87 is built into the guide portion 83. The spring 87 is disposed along the shaft 82, and a leading end portion of the spring 87 is housed in the base end portion of the bit portion 84 and biases the bit portion 84 towards a leading end side thereof.

The socket 85 retains a bolt 51. A leading end surface of the socket 85 is magnetized, and retains the bolt 51 by way of the magnetism of the socket 85.

With the fastening portion 80 described above, the shaft 82 rotates when the drive source 73 is connected to the joint portion 821 of the shaft 82 and rotationally driven. This rotational force is transmitted to the bit portion 84 via the guide portion 83, whereby the socket 85 rotates.

In addition, when the shaft 82 is pressed by the drive source 73, the shaft 82, the guide portion 83 and the bit portion 84 advance against the biasing force exerted by the spring 86; however, when this pressing force exerted by the drive source 73 is released, they return to an original position by way of the resilience of the spring 86.

In addition, even if a pressing force in the axial direction acts on the socket 85, this pressing force is mitigated by the bit portion 84 retracting against the biasing force of the spring 87. Thereafter, when this pressing force is released, the bit portion 84 returns to the original position by way of the resilience of the spring 87.

The drive source 73 is disposed behind the holder 722, and includes a rotary drive portion 731. A leading end of the rotary drive portion 731 is configured to be fittable with the joint portion 821 of the fastening portion 80. A rotational direction X of the rotary drive portion 731 is configured to be substantially parallel to the rotational axis of the holder 722.

The advance/retract mechanism 74 is provided to the mounting bracket 721, and is controlled by the control device 7 to cause the drive source 73 to advance or retract along the rotational axis X.

The advance/retract mechanism 74 includes a pair of cylinder mechanisms 75 and a pair of sliding guides 76.

Each of the pair of cylinder mechanisms 75 includes a piston rod 751 mounted to the drive source 73 and a cylinder 752 that makes the piston rod 751 advance and retract. The drive source 73 advances and retracts along the rotational axis X of the rotary drive portion 731 when the pair of cylinder mechanisms 75 is driven.

Each of the pair of sliding guides 76 includes a slide beam 761 mounted to the drive source 73, and a slide portion 762 provided to the mounting bracket 721 and into which the slide beam 761 is inserted. The pair of sliding guides 76 guides the advance/retract movement of the drive source 73 when the slide beam 761 slides in the slide portion 762.

Operation of the aforementioned fastening hand 70 will be explained next.

As an initial setting, the rotational axis Y of the fastening portion 80 is positioned on the rotational axis X of the rotary drive portion 731 of the drive source 73, as shown in FIG. 9.

The robot arm 71 is controlled by the control device 7 to cause the fastening hand 70 to move from this position to a mounting position. More specifically, the robot arm 71 is controlled so that the mounting position of the bolt 51 is coaxial with the rotational axis of the drive source 73.

Next, the advance/retract mechanism 74 is driven to cause the drive source 73 to advance, whereby the rotary drive portion 731 of the drive source 73 is connected to the shaft 82 of the fastening portion 80.

Subsequently, the drive source 73 is made to further advance against the biasing force of the spring 86, and a bolt 51 retained in a fastening portion 80 is made to project from the front face of the fastening hand 70, thereby pushing the bolt 51 out to the mounting position.

Next, the rotary drive portion 731 of the drive source 73 is driven. When this is done, the rotational force of the rotary drive portion 731 is transmitted to the fastening portion 80, whereby a socket 85 rotates. The bolt 51 is thereby tightened at the mounting position.

Next, the rotary drive portion 731 of the drive source 73 is made to retract by driving the advance/retract mechanism 74. When this is done, the socket 85 retracts by way of the resilience of the spring 86, and the fastening portion 80 returns to the original position. Subsequently, the drive source 73 is made to further retract, thereby causing the rotary drive portion 731 of the drive source 73 to separate from the shaft 82 of the fastening portion 80.

Next, the holder 722 is made to rotate in the A-arrow direction or the B-arrow direction by driving the holder drive portion 723, whereby a rotational axis Y of a subsequent fastening portion 80 is disposed coaxial with the rotational axis X of the rotary drive portion 731 of the drive source 73.

Thereafter, the robot arm 71 is controlled by the control device 7, such that the fastening hand 70 is moved to a subsequent mounting position, repeating the same operations as the above described.

Figure 12:
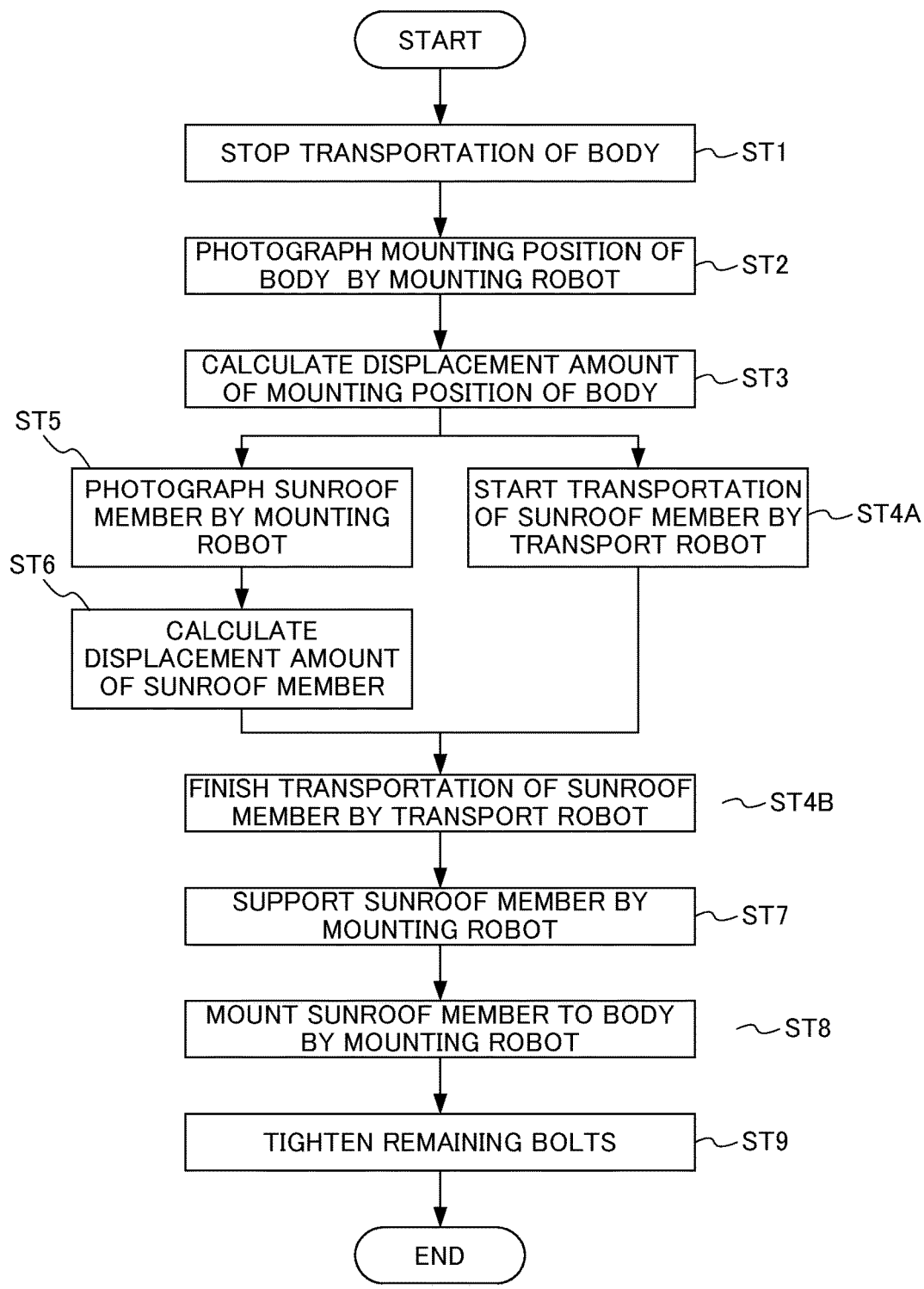
FIG. 12 is a flowchart of the operation of a workpiece mounting system according to the embodiment.

Operation of the workpiece mounting system 1 will be explained while referring to the flowchart of FIG. 12.

In Step ST1, transport of the body 2 is stopped.

In Step ST2, the first mounting robots 5 go into the interior of the body 2 through the front door openings 42 on both sides of the body 2, and CCD cameras 241 of the first mounting robots 5 are brought close to the inner panel 2A. Next, the nuts 44B of the inner panel 2A are photographed by the CCD cameras 241, after which the first mounting robots 5 are made to exit.

In Step ST3, displacement amounts of the nuts 44B from positions taught in advance are calculated by the control device 7 as displacement amounts of workpiece mounting positions related to positional information, based on the photographed images of the inner panel 2A.

In Step ST4A, the sunroof member 3 is made to be held by the transport robot 4 at a workpiece supply location, which is not illustrated. Then, transport of the sunroof member 3 to the front window opening 41 of the body 2 is initiated by moving the transport robot 4.

In Step ST5, the first mounting robots 5 are positioned below the transported sunroof member 3 and made to move synchronously with the operation of the transport robot 4 until the sunroof member 3 reaches the front window opening 41 of the body 2. Subsequently, the bolt holes 34B of the sunroof member 3 are photographed as reference positions by the CCD cameras 241 of the first mounting robots 5.

In Step ST6, displacement amounts of the bolt holes 34B from positions taught in advance are calculated by the control device 7 as displacement amounts of workpiece positions related to positional information, based on the photographed images of the sunroof member 3.

In Step ST4B, the transport robot 4 causes the sunroof member 3 to enter the interior of the body 2 through the front window opening 41 of the body 2 and to stop below the inner panel 2A.

At this time, the sunroof member 3 is made to stop so that the positioning holes 35 of the sunroof member 3 are located directly below the positioning holes 45 of the body 2, based on the displacement amounts of workpiece positions and the displacement amounts of workpiece mounting positions calculated in Step ST3.

In Step ST7, the first mounting robots 5 are controlled to be brought close to the sunroof member 3 from below and the positioning pins 223 are inserted into the positioning holes 35 of the sunroof member 3, while both edges of the sunroof member 3 are supported by the first mounting robots 5. Accordingly, the first mounting robots 5 come to receive the sunroof member 3 from the transport robot 4. Herein, the aforementioned displacement amounts of workpiece positions are reflected in the operation of the first mounting robots 5 to correct the operation of the first mounting robots 5. Thereafter, the transport robot 4 is made to exit from the interior of the body 2.

In Step ST8, the first mounting robots 5 are lifted and transport the sunroof member 3 to cause the positioning pins 223 to be inserted into the positioning holes 45 of the body 2. In this manner, the sunroof member 3 is positioned to the inner panel 2A of the body 2. Herein, the aforementioned displacement amounts of workpiece mounting positions and the displacement amounts of workpiece positions are reflected in the operation of the first mounting robots 5 to correct the operation of the first mounting robots 5.

When this is done, the bolt holes 34A of the sunroof member 3 geometrically match the nuts 44A of the body 2. The nut runners 23 are actuated, and they tighten the two bolts 51A to the nuts 44A of the body 2 through the bolt holes 34A of the sunroof member 3.

In Step ST9, the remaining bolts 51 other than the bolts 51A are installed in the fastening portions 80 of the second mounting robots 6. These remaining bolts are tightened to the nuts 44 through the bolt holes 34 of the sunroof member 3.

Herein, the aforementioned displacement amounts of workpiece positions are reflected in the operation of the second mounting robots 6 to correct the operation of the second mounting robots 6.

There are the following effects according to the present embodiment.

(1) First, the inner panel 2A of the body 2 is photographed by the CCD cameras 241 of the first mounting robots 5, and the displacement amount of the inner panel 2A from the position taught in advance is calculated based on these photographed images.

Next, the sunroof member 3 is held by the transport robot 4 at the workpiece supply location, and the sunroof member 3 is transported to be positioned in the vicinity of the inner panel 2A. Simultaneously with the transport of the sunroof member 3, the sunroof member 3 is photographed by the CCD cameras 241 of the first mounting robots 5, and the displacement amount of the sunroof member 3 from the position taught in advance is calculated based on these photographed images.

Next, the sunroof member 3 is received by the first mounting robots 5 from the transport robot 4, and the sunroof member 3 is held and transported, whereby the sunroof member 3 is positioned to the inner panel 2A of the body 2. Thereafter, two locations of the sunroof member 3 are preliminarily fixed to the inner panel 2A with the bolts 51A by the nut runners 23 of the first mounting robots 5. Herein, the displacement amount of the inner panel 2A calculated and the displacement amount of the sunroof member 3 are reflected in the operation of the first mounting robots 5 to correct the operation of the first mounting robots 5.

Next, the second mounting robots 6 are controlled to perform main fixing of two locations of the sunroof member 3 to the inner panel 2A with the bolts 51A by way of the fastening hands 70 of the second mounting robots 6. Herein, the displacement amount of the inner panel 2A already calculated is reflected in the operation of the second mounting robots 6 to correct the operation of the second mounting robots 6.

In this way, the roles are shared between the first mounting robots 5 and the second mounting robots 6: only positioning and preliminary fixing of the sunroof member 3 is performed by the first mounting robots 5 and main fixing of the sunroof member 3 is performed by the second mounting robots 6. Therefore, the general versatility is raised since the shape of the sunroof member 3 can be handled even in a case of changing for every model, by respectively configuring the first mounting robots 5 and the second mounting robots 6 to the optimal structure according to their role, whereby the cycle time can be shortened.

(2) By simply calculating the displacement amount of the inner panel 2A and the displacement amount of the sunroof member 3 one time by way of the CCD cameras 241 of the mounting robots 5 as positional information, the operation of the first mounting robots 5 and the second mounting robots 6 are corrected based on this positional information calculated. Therefore, the operating cost can be reduced, and the cycle time can be further shortened, since it is no longer necessary for the positions of the sunroof member 3 and the inner panel 2A of the body 2 to be detected many times over.

Second Embodiment

Figure 13:
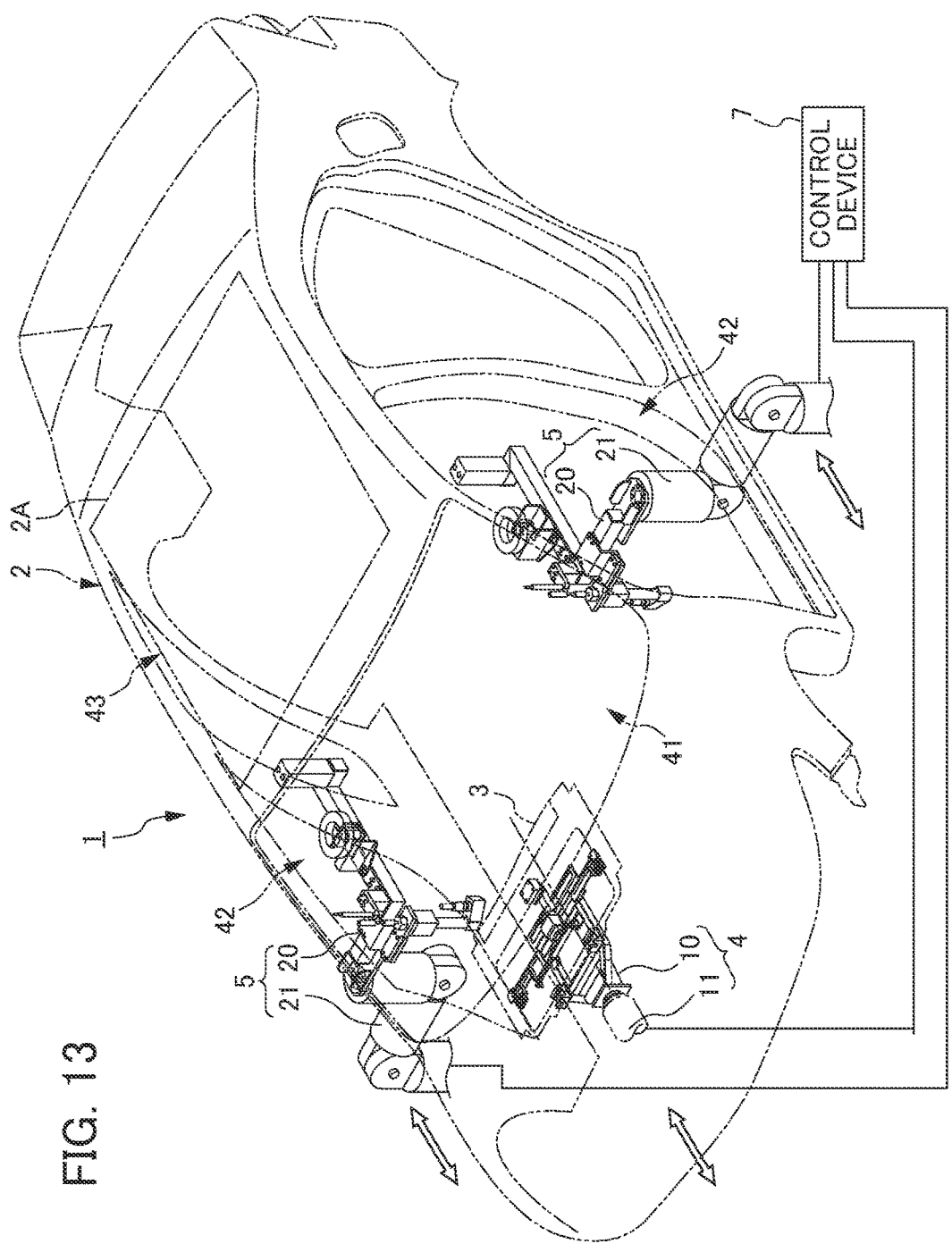
FIG. 13 is an overall perspective view of a workpiece mounting system to which a sunroof unit holding device is applied according to a second embodiment of the present invention.

FIG. 13 is an overall perspective view of a workpiece mounting system 1 to which a sunroof unit holding device according to a second embodiment of the present invention has been applied.

The workpiece mounting system 1 mounts a sunroof member 3 as a sunroof unit to a body 2 transported by a transport conveyor, which is not illustrated.

A front window opening 41 in which a front window is mounted is formed in a front of the body 2, and front door openings 42 in which front doors are mounted are formed in both sides of the body 2.

The sunroof member 3 is mounted to a roof 43 of the body 2 from an interior side of the body 2.

The workpiece mounting system 1 includes a transport robot 4 that transports the sunroof member 3 to a vicinity of the mounting positions on the body 2, a pair of mounting robots 5 that positions the sunroof member 3 transported by the transport robot 4 to the body 2, and a control device 7 that controls the transport robot 4 and the mounting robots 5.

Figure 14:
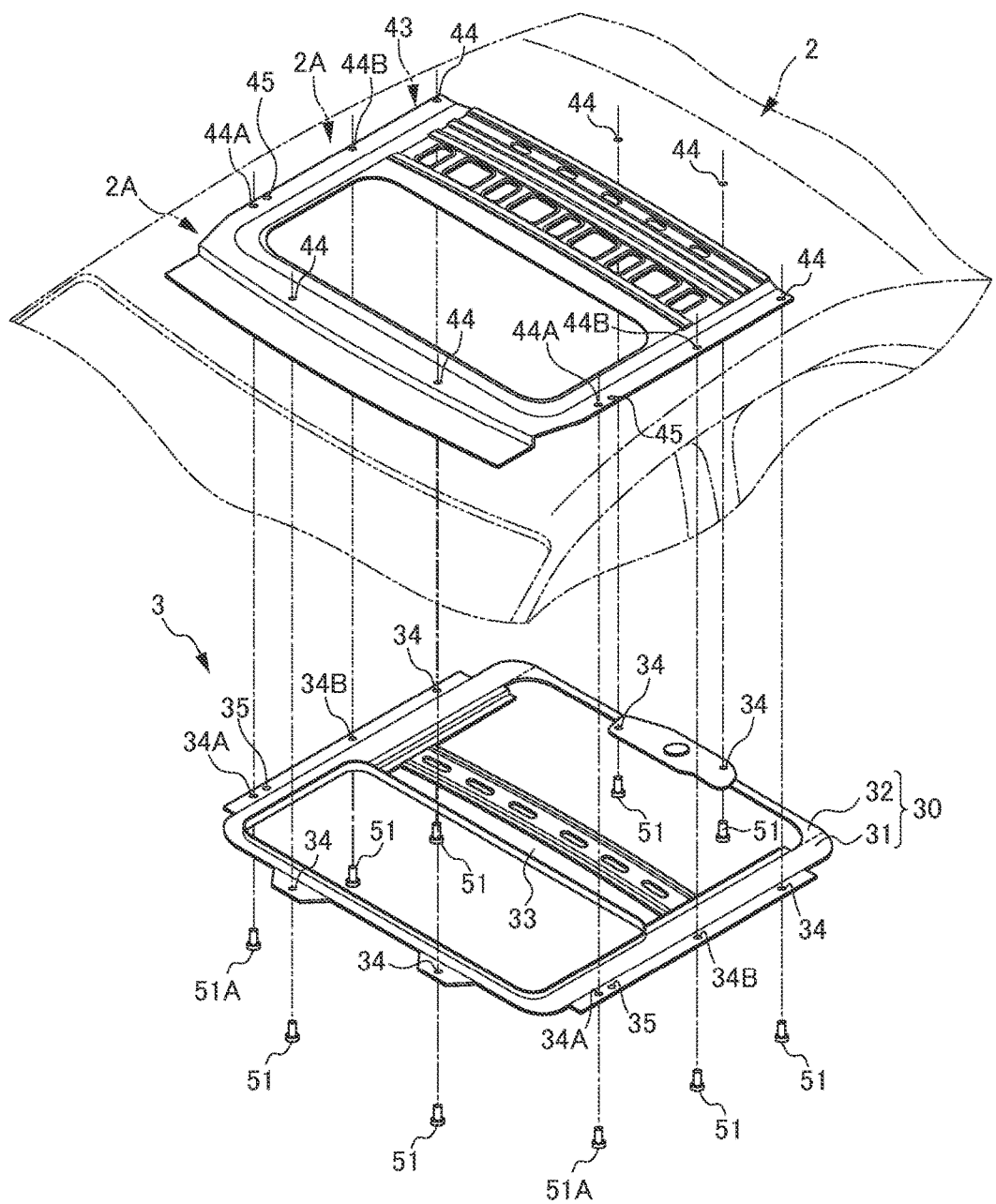
FIG. 14 is a perspective view of a sunroof unit and a portion to which the sunroof unit is mounted according to the second embodiment.

FIG. 14 is a perspective view of the sunroof member 3 and an inner panel 2A to which the sunroof member 3 is mounted.

The sunroof member 3 includes a rectangularly-shaped frame 30 and a center frame 33 provided to straddle portions of the frame 30 facing each other.

The rectangularly-shaped frame 30 is configured by a substantially U-shaped main frame 31, and a sub-frame 32 connecting leading end portions of the main frame 31 that extend substantially in parallel to each other.

The center frame 33 connects portions of the main frame extending substantially in parallel to each other.

Among the frames configuring the sunroof member 3, the main frame 31 and the center frame 33 make the basic structure common to various sunroof members.

Ten bolt holes 34 are formed in a rim portion of the sunroof member 3. Among the bolt holes 34, those positioned towards the front on both sides of the sunroof member 3 are defined as bolt holes 34A, and those disposed backward of these bolts holes 34A are defined as bolt holes 34B.

In addition, positioning holes 35 are formed in a vicinity of these bolt holes 34A.

The inner panel 2A is a panel configuring the inside of the roof 43 of the body 2. Nuts 44 are formed in the inner panel 2A to correspond to the bolt holes 34 of the sunroof member 3. Among these nuts 44, assuming that those corresponding to the bolt holes 34A of the sunroof member 3 are defined as nuts 44A, positioning holes 45 are formed in a vicinity of these nuts 44A to correspond to the positioning holes 35 of the sunroof member 3. In addition, among these nuts 44, those corresponding to the bolt holes 34B of the sunroof 3 are defined as nuts 44B.

The sunroof member 3 is mounted to the inner panel 2A by inserting bolts 51 into the bolt holes 34 of the sunroof member 3 from the interior side of the body 2, and threading into the nuts 44 of the inner panel 2A. Herein, among the bolts 51, those threaded into the nuts 44A are defined as bolts 51A.

Referring back to FIG. 13, the transport robot 4 is disposed at a front side of the body 2, and holds the sunroof member 3 and transports the sunroof member 3 thus held to the interior of the body 2 by moving toward the body 2.

The transport robot 4 includes a transport hand 10 as a sunroof unit holding device, and a robot arm 11 that is provided on a floor to be movable along a length direction of the body 2 and that causes the attitude and position in three-dimensional space of the transport hand 10 to change.

Figure 15:
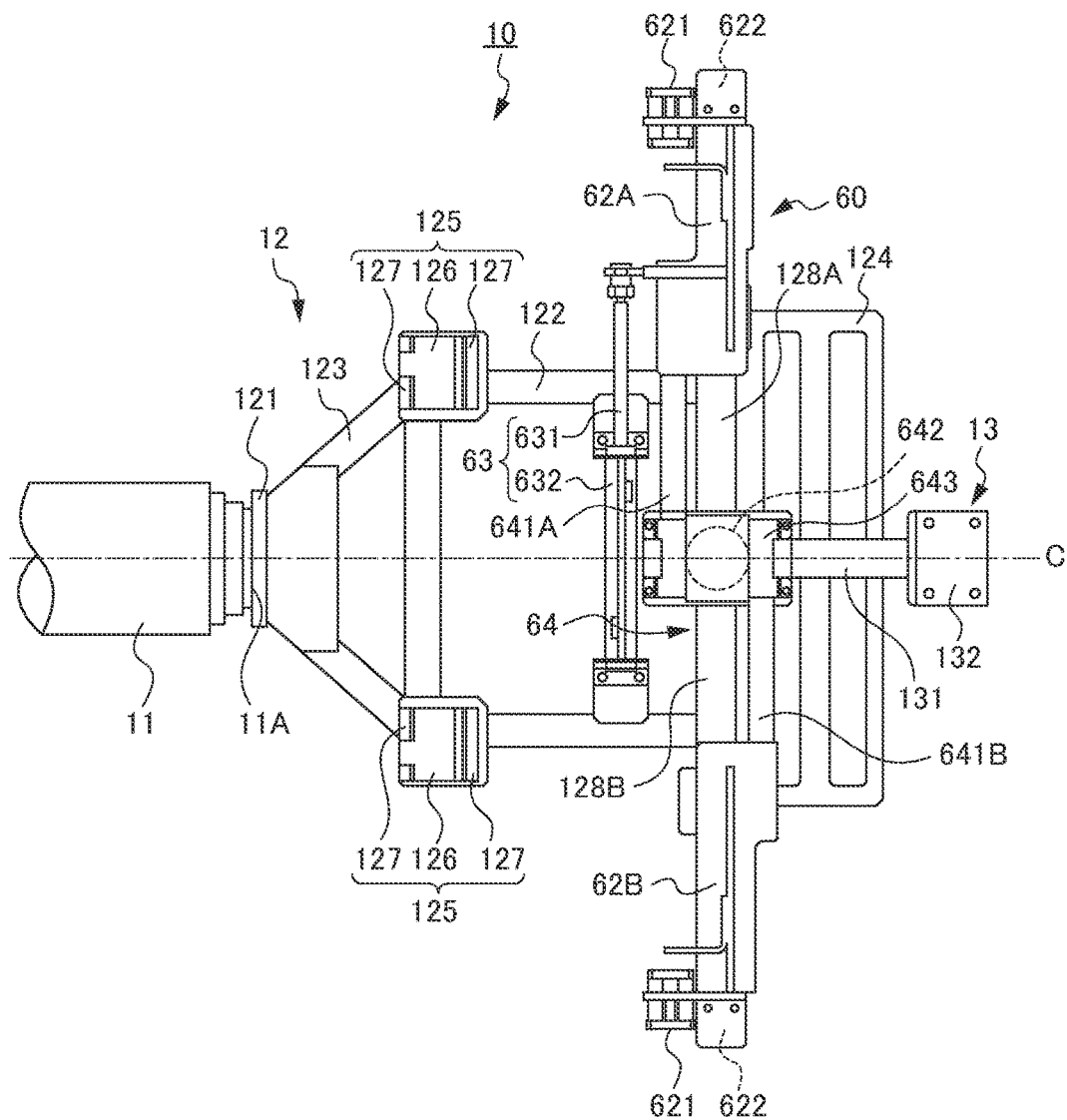
FIG. 15 is a plan view of a transport hand of a transport robot of the workpiece mounting system according to the second embodiment.
Figure 16:
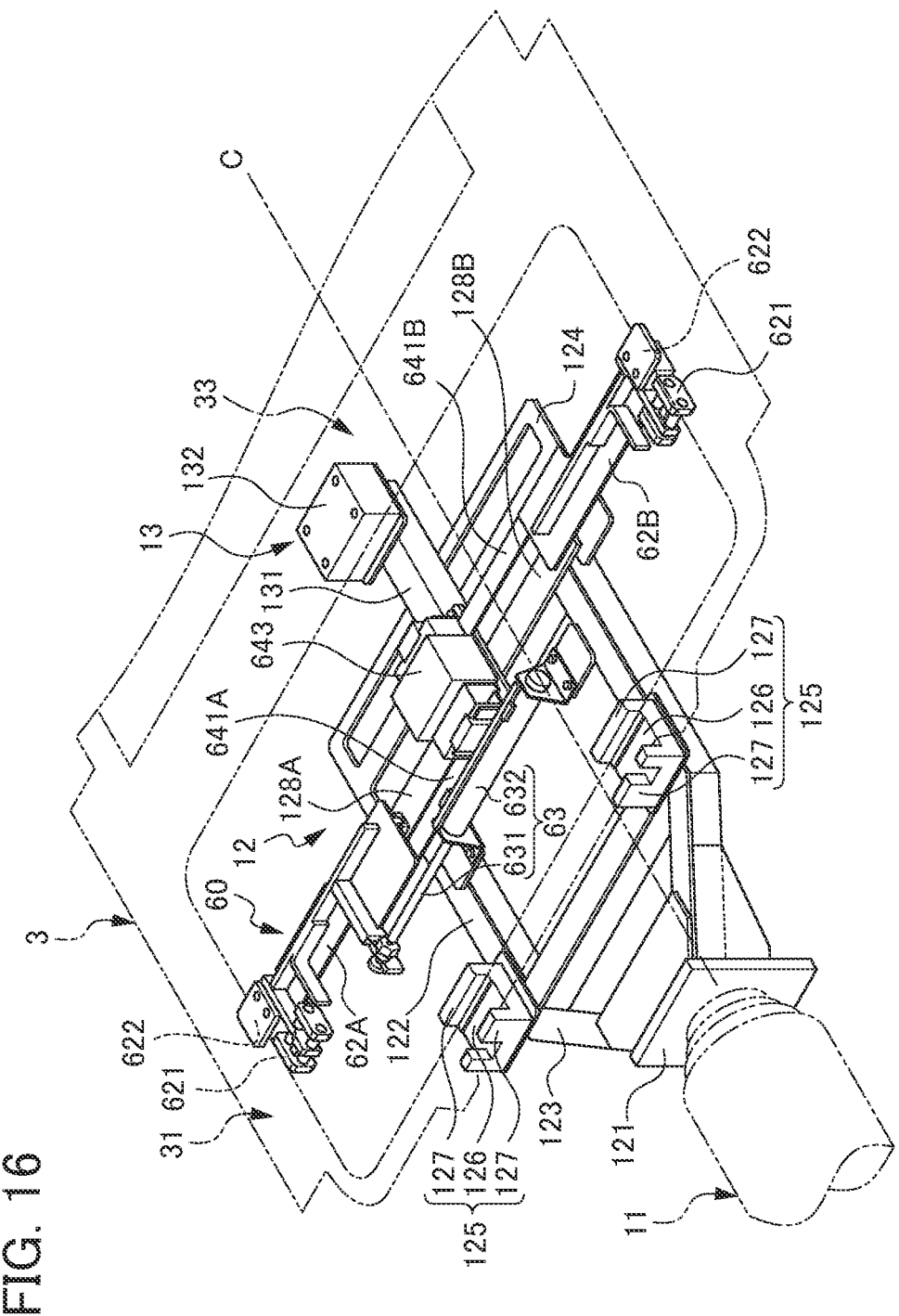
FIG. 16 is a perspective view of the transport hand of the transport robot according to the second embodiment.

FIG. 15 is a plan view of the transport hand 10 of the transport robot 4. FIG. 16 is a perspective view of the transport hand 10.

The transport hand 10 is substantially cross-shaped in a plan view, and includes a plate-shaped base portion 12 that extends along a central axis C of a flange surface 11A of the robot arm 11, a holding mechanism 60 provided to the base portion 12, and a projecting portion 13 that projects from a leading end of the base portion 12 along the central axis C.

The projecting portion 13 includes a support portion 131 supported by the base portion 12, and a center frame seating portion 132 provided to a leading end of the support portion 131.

A bottom of the center frame 33 is seated on the center frame seating portion 132.

The base portion 12 includes a support portion 121 mounted to the flange surface 11A of the robot arm 11, a substantially rectangular frame portion 122, a connecting portion 123 that connects the frame portion 122 and the support portion 121, a reinforcement plate 124 provided to a leading end side of the frame portion 122, and guide portions 128A and 128B provided on the frame portion 122 that extend in a direction intersecting the central axis C.

Main frame seating portions 125 are provided at two angled portions of the frame portion 122 on a side directed to the support portion 121. A bottom of a portion of the substantially U-shaped main frame 31 substantially parallel to the center frame 33 is seated on a main frame seating portion 125.

The main frame seating portion 125 includes a base 126 and a pair of walls 127 arranged vertically to the base 126.

The pair of walls 127 is disposed opposite to each other, and extends in a direction intersecting the central axis C.

The holding mechanism 60 includes a pair of pressing portions 62A and 62B movable along the guide portions 128A and 128B, and an advance/retract mechanism 63 configured to make the pressing portion 62A advance and retract along the guide portion 128A, and a link mechanism 64 configured to make the pressing portion 62B move interlocking with the movement of the pressing portion 62A.

Slide guides, which are not illustrated, are provided to top surfaces of the guide portions 128A and 128B.

Slide rails that fit to the slide guides of the guide portions 128A and 128B are provided to bottom surfaces of the pressing portions 62A and 62B. The pair of pressing portions 62A and 62B are thereby able to slide along the guide portions 128A and 128B.

A pressing surface 621 substantially perpendicular to the base portion 12 and a retaining surface 622 substantially parallel to the base portion 12 are provided to a leading end of each of the pressing portions 62A and 62B.

The advance/retract mechanism 63 is mounted in a direction intersecting the central axis C on the frame portion 122 of the base portion 12, and includes a piston rod 631 having a leading end that mounts to the pressing portion 62A, and a cylinder 632 that causes the piston rod 631 to advance and retract.

The link mechanism 64 includes a rack 641A that is mounted to the pressing portion 62A and extends in a sliding direction of the pressing portion 62A, a rack 641B that is mounted to the pressing portion 62B and extends in a sliding direction of the pressing portion 62B, a pinion 642 that is rotatably provided between these racks 641A and 641B on the central axis C and that engages with the racks 641A and 641B, and a case 643 housing the pinion 642.

A distance from the pressing portion 62A to a portion of the rack 641A engaging with the pinion 642 and a distance from the pressing portion 62B to a portion of the rack 641B engaging with the pinion 642 are made to be the same dimension. Accordingly, a distance from the pressing portion 62A to the central axis C and a distance from the pressing portion 62B to the central axis C always match each other, even when the pressing portion 62A moves along the guide portion 128A. In other words, the position of the pressing portion 62A and the position of the pressing portion 62B are always axisymmetric about the central axis C.

According to the holding mechanism 60, when the piston rod 631 is made to advance by driving the advance/retract mechanism 63, the pressing portion 62A moves towards outside along the guide portion 128A. Accompanying this movement of the pressing portion 62A, the pressing portion 62B also moves towards outside along the guide portion 128B.

Therefore, when the sunroof member 3 is placed on the transport hand 10 of the transport robot 4, the center frame 33 of the sunroof member 3 sits on the center frame seating portion 132. In addition, portions of the main frame 31 that are substantially parallel to the center frame 33 sit on the two main frame seating portions 125. More specifically, each portion of the main frame 31 that is substantially parallel to the center frame 33 fits between the pair of walls 127 of each main frame seating portion 125, whereby movement of the sunroof member 3 in a direction along the central axis C is regulated.

Thereafter, when the holding mechanism 60 is driven, the pressing portions 62A and 62B are made to move towards outside, so that lateral surfaces of the portions of the main frame 31 extending substantially parallel to each other are held while pressed from inside by the pressing surfaces 621. In this manner, movement of the sunroof member 3 in-plane of the base portion 12 and in a direction intersecting the central axis C is regulated.

In addition, simultaneously with the pressing surfaces 621 abutting the lateral surfaces of portions of the main frame 31 extending substantially in parallel to each other, the retaining surfaces 622 cover top surfaces of the portions of the main frame 31 extending substantially in parallel to each other. Accordingly, movement of the sunroof member 3 in a direction substantially perpendicular to the base portion 12 is regulated.

Referring back to FIG. 13, the pair of mounting robots 5 is disposed on both sides of the body 2, and fixes the sunroof member 3 transported by the transport robot 4 to the inner panel 2A of the body 2.

The mounting robots 5 each include a hand 20, and a robot arm 21 that is provided on a floor and causes the attitude and position in three-dimensional space of the hand 20 to change.

Although a mounting robot 5 positioned on the left side of the body 2 will be explained below, another mounting robot 5 positioned on the right side of the body 2 has a similar configuration, and thus the appearance of these mounting robots 5 on the right and left sides is symmetrical about the body 2.

Figure 17:
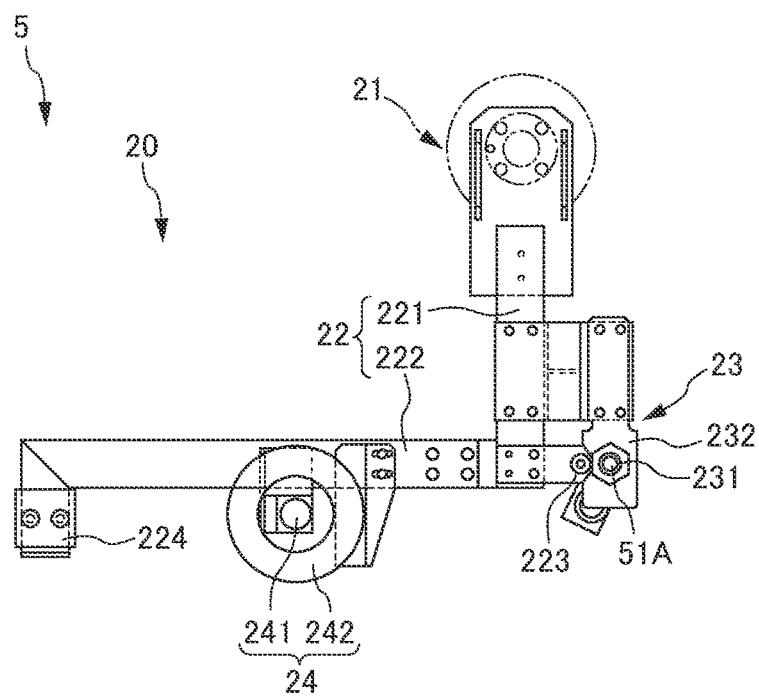
FIG. 17 is a plan view of a hand of a mounting robot according to the second embodiment.
Figure 18:
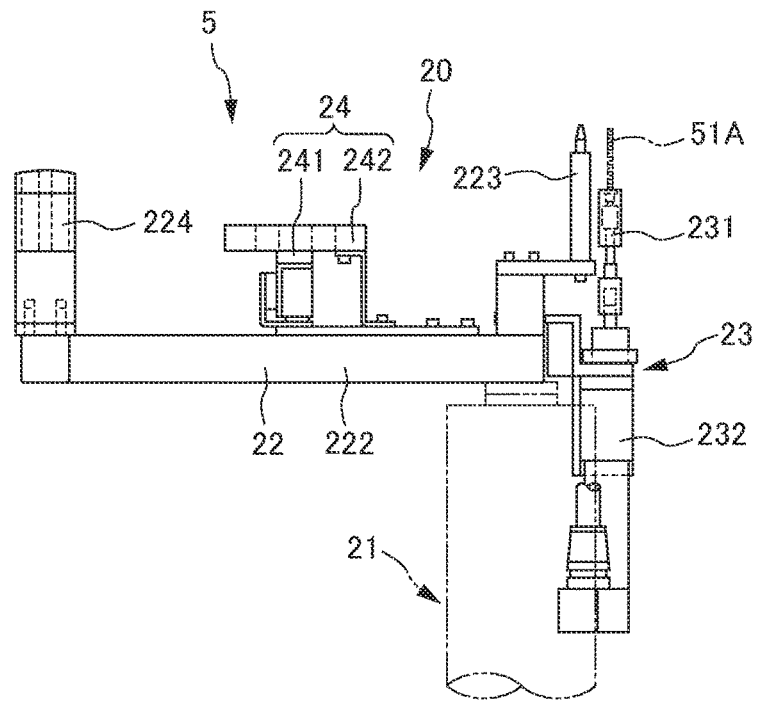
FIG. 18 is a side view of the hand of the mounting robot according to the second embodiment.
Figure 19:
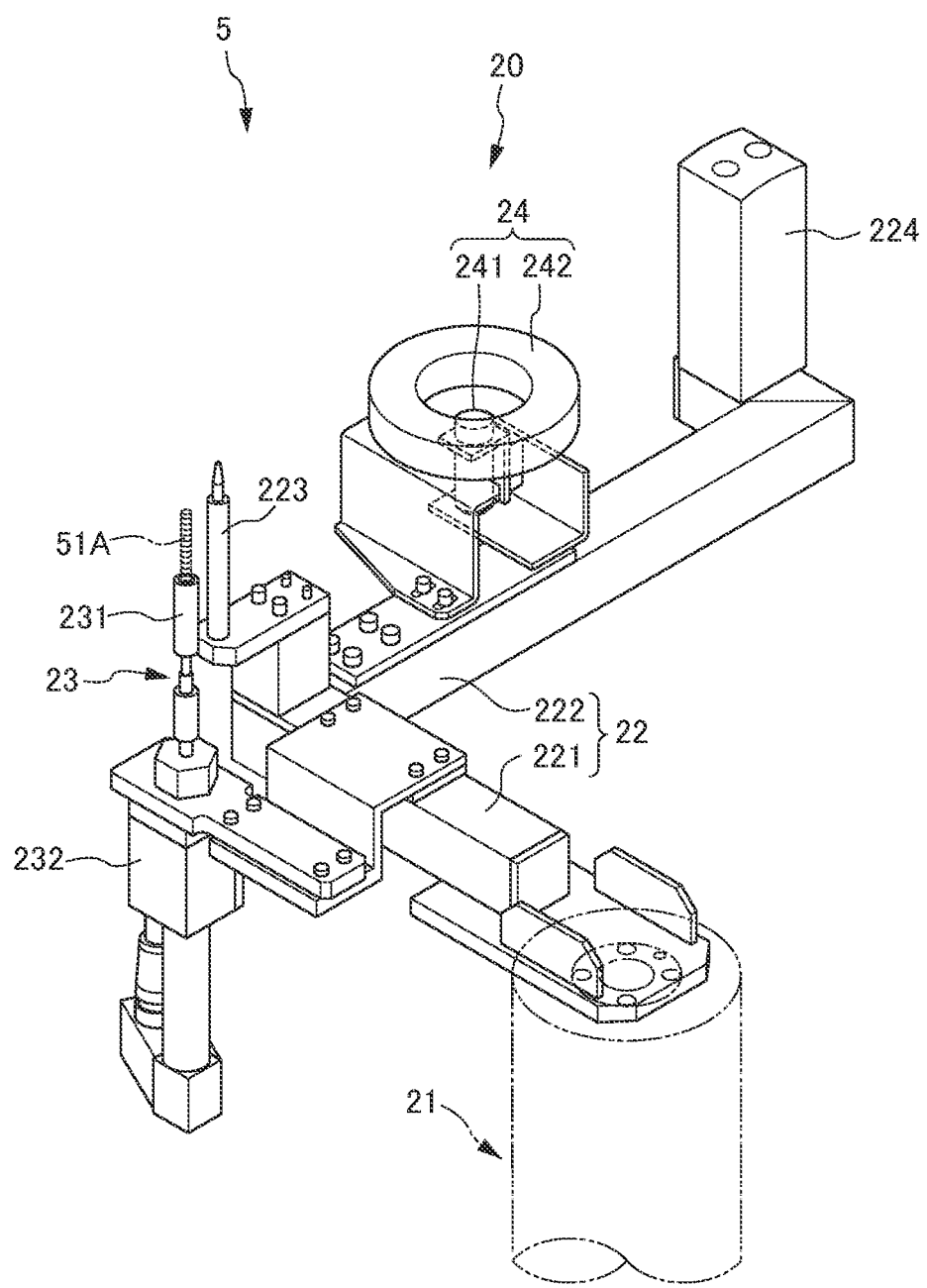
FIG. 19 is a perspective view of the hand of the mounting robot according to the second embodiment.

FIG. 17 is a plan view of the hand 20 of the mounting robot 5. FIG. 18 is a side view of the hand 20. FIG. 19 is a perspective view of the hand 20.

The hand 20 includes a substantially L-shaped support frame 22, a nut runner 23 provided to the support frame 22, and a photographing device 24 provided to the support frame 22.

The support frame 22 includes a first frame 221 extending from a flange surface of the robot arm 11 in an in-plane direction, and a second frame 222 orthogonal to the first frame 221 and extending from a leading end of the first frame 221.

A positioning pin 223 that projects upward is provided to an intersection portion between the first frame 221 and the second frame 222. In addition, a workpiece support pad 224 is provided to a top surface of the second frame 222 on a leading end side thereof.

The nut runner 23 is provided in a middle of the first frame 221 of the support frame 22, and includes a socket 231 into which the bolt 51A fits, and a drive device 232 that rotationally drives the socket 231.

When the drive device 232 is driven in the nut runner 23, the bolt 51A fit to the socket 231 is made to rotate at a predetermined torque.

The photographing device 24 is provided in a middle of the second frame 222 of the support frame 22, and includes a CCD camera 241 disposed facing upwards, and a ring-shaped lighting system 242 that illuminates a photographing target of the CCD camera 241.

Figure 20:
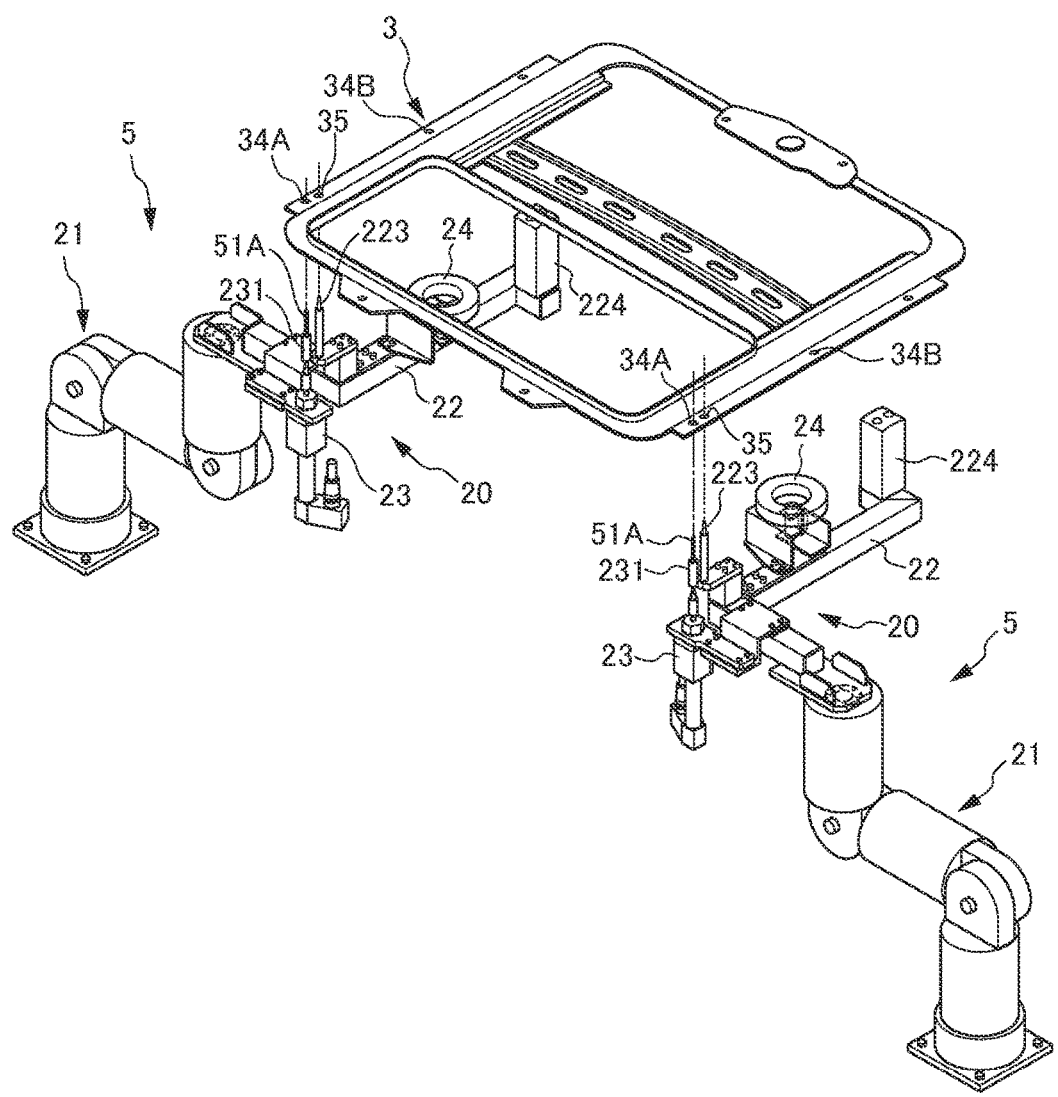
FIG. 20 is an exploded perspective view showing the sunroof unit supported by the mounting robot according to the second embodiment.

When the sunroof member 3 is placed on the hand 20 of the mounting robot 5, the positioning pin 223 of support frame 22 is inserted into the positioning hole 35 of the sunroof member 3, as shown in FIG. 20. Then, the sunroof member 3 is supported by the positioning pin 223 and workpiece support pad 224 of the support frame 22. In addition, the bolt 51A chucked in the socket 231 of the nut runner 23 is inserted into the bolt hole 34A of the sunroof member 3.

Figure 21:
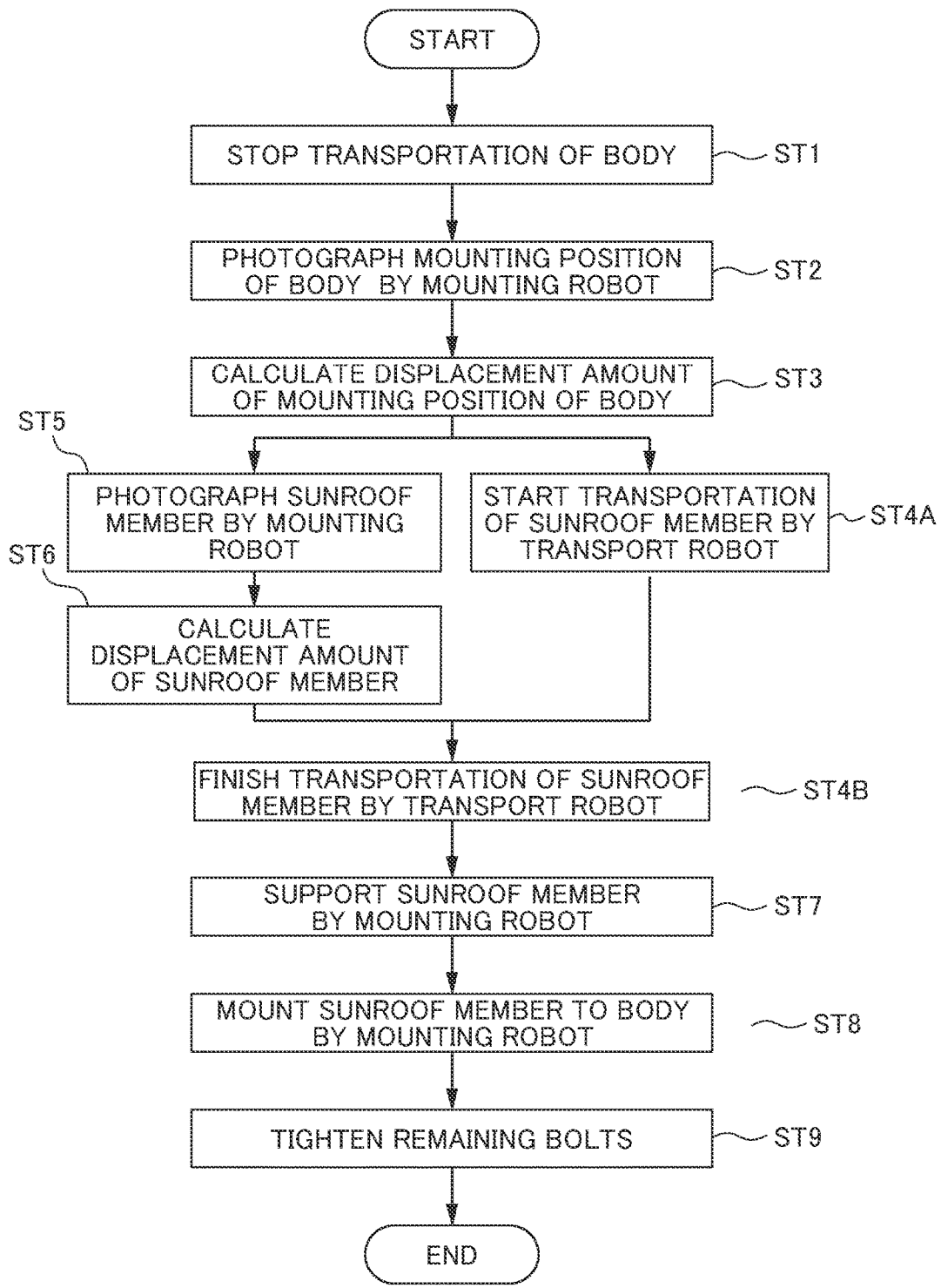
FIG. 21 is a flowchart of the operation of the workpiece mounting system according to the second embodiment.

Operation of the workpiece mounting system 1 will be explained while referring to the flowchart of FIG. 21.

In Step ST1, transport of the body 2 is stopped.

In Step ST2, the mounting robots 5 go into the interior of the body 2 through the front door openings 42 on both sides of the body 2, and the CCD cameras 241 of the mounting robots 5 are brought close to the inner panel 2A. Next, the nuts 44B of the inner panel 2A are photographed by the CCD cameras 241, after which the mounting robots 5 are made to exit.

In Step ST3, displacement amounts of the nuts 44B from positions taught in advance are calculated by the control device 7 as displacement amounts of workpiece mounting positions, based on the photographed images of the inner panel 2A.

In Step ST4A, the sunroof member 3 is made to be held by the transport robot 4 at a workpiece supply location, which is not illustrated. Then, transport of the sunroof member 3 to the front window opening 41 of the body 2 is initiated by moving the transport robot 4.

In Step ST5, the mounting robots 5 are positioned below the transported sunroof member 3 and the mounting robots 5 are made to move synchronously with the operation of the transport robot 4 until the sunroof member 3 reaches the front window opening 41 of the body 2. Subsequently, the bolt holes 34B of the sunroof member 3 are photographed as reference positions by the CCD cameras 241 of the mounting robots 5.

In Step ST6, displacement amounts of the bolt holes 34B from positions taught in advance are calculated by the control device 7 as displacement amounts of workpiece positions, based on the photographed images of the sunroof member 3.

In Step ST4B, the transport robot 4 causes the sunroof member 3 to enter the interior of the body 2 through the front window opening 41 of the body 2 and to stop below the inner panel 2A.

At this time, the sunroof member 3 is made to stop so that the positioning holes 35 of the sunroof member 3 are located directly below the positioning holes 45 of the body 2, based on the displacement amounts of workpiece positions and the displacement amounts of workpiece mounting positions calculated in Step ST3.

In Step ST7, the mounting robots 5 are controlled to be brought close to the sunroof member 3 from below and the positioning pins 223 are inserted into the positioning holes 35 of the sunroof member 3, while both edges of the sunroof member 3 are supported by these mounting robots 5. Accordingly, the mounting robots 5 come to receive the sunroof member 3 from the transport robot 4. Herein, the aforementioned displacement amounts of workpiece positions are reflected in the operation of the mounting robots 5 to correct the operation of the mounting robots 5. Thereafter, the transport robot 4 is made to exit from the interior of the body 2.

In Step ST8, the mounting robots 5 are lifted to cause the positioning pins 223 to be inserted into the positioning holes 45 of the body 2. In this manner, the sunroof member 3 is positioned to the inner panel 2A of the body 2. Herein, the aforementioned displacement amounts of workpiece mounting positions and the displacement amounts of workpiece positions are reflected in the operation of the mounting robots 5 to correct the operation of the mounting robots 5.

When this is done, the bolt holes 34A of the sunroof member 3 geometrically match the nuts 44A of the body 2. The nut runners 23 are actuated, and they tighten the two bolts 51A to the nuts 44A of the body 2 through the bolt holes 34A of the sunroof member 3.

In Step ST9, the remaining bolts 51 other than the bolts 51A are prepared and tightened to the nuts 44 through the bolt holes 34 of the sunroof member 3 by a bolt tightening robot that is not illustrated.

There are the following effects according to the present embodiment.

(1) The transport hand 10 is configured to include the center frame seating portion 132 on which the bottom of the center frame 33 sits, the main frame seating portions 125 on which the bottoms of the main frame 31 sit, and a pair of pressing portions 62A and 62B that presses the lateral sides of the main frame 31. More specifically, the transport hand 10 is configured to hold the main frame 31 and the center frame 33, which are portions common to the sunroof members 3 of every vehicle model.

Therefore, the sunroof member 3 is first held and transported by the transport robot 4 to be positioned in the vicinity of the inner panel 2A. Next, the bolt holes 34 of the sunroof member 3 are photographed by the CCD cameras 241 of the mounting robots 5, and the displacement amounts of the bolt holes 34 from the positions taught in advance are calculated based on these photographed images. Then, the sunroof member 3 is received from the transport robot 4 while correcting the operation of the mounting robots 5, and the sunroof member 3 thus received is mounted to the inner panel 2A of the body 2.

Accordingly, since the portions common to every sunroof member are held by the transport hand 10, multiple types of the sunroof member 3 can be held by a single transport hand 10, thereby raising the general versatility of a facility.

It should be noted that the present invention is not to be limited to the embodiments, and modification, improvements and the like within a scope that can achieve the objects of the present invention are included in the present invention.

EXPLANATION OF REFERENCE NUMERALS 1 workpiece mounting system
2 body (second workpiece)

2A inner panel (mounting portion)
3 sunroof member (first workpiece, sunroof unit)
5 first mounting robot (first robot)
6 second mounting robot (second robot)
7 control device
10 transport hand (sunroof unit holding device)
23 nut runner (preliminary fixing means)
31 main frame
33 center frame
62A, 62B pressing portions
70 fastening hand (main fixing means)
125 main frame seating portion
132 center frame seating portion
223 positioning pin (holding means)
223 workpiece support pad (holding means)
241 CCD camera (position detection means)

The invention claimed is:

1. A sunroof unit holding device for holding a sunroof unit, the sunroof unit having structural elements including a substantially U-shaped main frame and a center frame configured to connect portions of the main frame extending substantially parallel to each other, the device comprising:
   a center frame seating portion on which a bottom of the center frame sits;
   a main frame seating portion on which a bottom of a portion of the main frame substantially parallel to the center frame sits; and
   a pair of pressing portions configured to press the portions of the main frame extending substantially parallel to each other from inner lateral sides thereof,
   wherein the sunroof unit holding device is configured to hold and move the sunroof unit in a state in which the sunroof unit holding device is attached to a robot arm, and
   wherein the sunroof unit holding device is configured to be usable for a plurality of sunroof units each of which includes the structural elements.

2. A method for holding a sunroof unit by a sunroof unit holding device, the sunroof unit having structural elements including a substantially U-shaped main frame and a center frame configured to connect portions of the main frame extending substantially parallel to each other, the method comprising the steps of:
   supporting a bottom of the center frame and a portion of the main frame substantially parallel to the center frame; and
   holding the sunroof unit by pressing the portions of the main frame substantially parallel to each other from inner lateral sides thereof,
   wherein the sunroof unit holding device is configured to hold and move the sunroof unit in a state in which the sunroof unit holding device is attached to a robot arm, and
   wherein the sunroof unit holding device is configured to be usable for a plurality of sunroof units each of which includes the structural elements.

* * * * *